(12) United States Patent
Takami et al.

(10) Patent No.: US 6,932,176 B2
(45) Date of Patent: Aug. 23, 2005

(54) CONTROL SYSTEM FOR HYBRID VEHICLE

(75) Inventors: Shigeki Takami, Anjo (JP); Kiyotomo Miura, Anjo (JP); Satoru Wakuta, Anjo (JP); Hiroatsu Endo, Toyota (JP); Tatsuya Ozeki, Toyota (JP)

(73) Assignees: Aisin Aw Co., Ltd., Anjo (JP); Toytoa Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/890,454

(22) Filed: Jul. 14, 2004

(65) Prior Publication Data

US 2005/0029023 A1 Feb. 10, 2005

(30) Foreign Application Priority Data

Jul. 18, 2003 (JP) ........................................ 2003-199463

(51) Int. Cl.[7] .................................................. B60K 6/00
(52) U.S. Cl. .................... 180/65.2; 180/65.5; 180/65.6; 180/65.8
(58) Field of Search ............................... 180/65.2, 65.1, 180/65.3, 65.4, 65.5, 65.6, 65.7, 65.8; 701/51, 22, 20, 53; 477/69, 80, 127; 290/40 C, 40 B, 40 F

(56) References Cited

U.S. PATENT DOCUMENTS

| | | | |
|---|---|---|---|
| 3,623,568 A | | 11/1971 | Mori |
| 4,335,429 A | * | 6/1982 | Kawakatsu ................ 180/65.2 |
| 6,083,138 A | * | 7/2000 | Aoyama et al. ........... 180/65.7 |
| 6,173,574 B1 | * | 1/2001 | Obayashi et al. ........... 60/710 |
| 6,253,127 B1 | * | 6/2001 | Itoyama et al. ............... 701/22 |
| 6,326,702 B1 | * | 12/2001 | Yonekura et al. ......... 290/40 C |
| 6,625,524 B2 | * | 9/2003 | Yamaguchi et al. .......... 701/22 |
| 6,757,599 B2 | * | 6/2004 | Nada ......................... 180/65.2 |
| 2003/0064854 A1 | | 4/2003 | Kotani |
| 2003/0075368 A1 | * | 4/2003 | Takaoka et al. ........... 180/65.2 |
| 2004/0084233 A1 | | 5/2004 | Wakuta et al. |

FOREIGN PATENT DOCUMENTS

| | | |
|---|---|---|
| JP | 47-31773 | 8/1972 |
| JP | A 8-207601 | 8/1996 |
| JP | A 2002-225578 | 8/2002 |

OTHER PUBLICATIONS

U.S. Appl. No. 10/862,437, filed Jun. 8, 2004.
U.S. Appl. No. 10/855,371, filed May 28, 2004, Nakamori et al.

* cited by examiner

Primary Examiner—Hau Phan
(74) Attorney, Agent, or Firm—Oliff & Berridge, PLC

(57) ABSTRACT

A control system for a hybrid vehicle that is capable of absorbing an inertial force which is generated during shifting of a stepped transmission. During shift control of the stepped transmission by a shift control device and before the shift control is completed, a during-shift drive control element controls a driving force which is output from a second drive unit such that a total driving force which is output from first and second drive units to the drive wheels equals a driver request output. Further, the during-shift drive control elements executes control so as to reduce a difference between the total driving force output to a drive wheel and the driver request output based on a change in a transmission force of the stepped transmission caused by a switch-over between a first brake and a second brake. Moreover, in an inertial phase of the switch-over between the first brake and the second brake, the during-shift drive control means controls a driving force of a second motor so as to absorb an inertial force which is generated by change in a rotational speed of the second motor with respect to the rotational speed of the drive wheel.

20 Claims, 16 Drawing Sheets

CONTROL SYSTEM FOR HYBRID VEHICLE

INCORPORATION BY REFERENCE

The disclosure of Japanese Patent Application No. 2003-199463 filed on Jul. 18, 2003 including the specification, drawings and abstract is incorporated herein by reference in its entirety.

BACKGROUND OF THE INVENTION

1. Field of Invention

The invention relates to a control system for a hybrid vehicle which includes first and second drive units. The first drive unit has an engine, a first motor, and a planetary gear for power distribution. The second drive unit has a second motor and a stepped transmission which is interposed between the second motor and a transmission shaft and which transmits a driving force of the first and second drive units to drive wheels. More particularly, the invention relates to a control system for a hybrid vehicle, that is capable of outputting a driver request output to the drive wheels when the shifting of the stepped transmission is completed or while shifting is being executed.

2. Description of Related Art

Recently, various types of hybrid vehicles have been proposed which take into consideration effects on the environment and which aim to improve fuel economy. Among the hybrid vehicles, so called dual-motor power-split-type parallel hybrid vehicles have been proposed, for example, in Japanese Patent Application Laid-Open No. 08-207601. In this type of hybrid vehicle, one rotation element of a planetary gear is connected to an output shaft of an engine, the other two rotation elements are connected to a transmission shaft coupled to a first motor and drive wheels, and a second motor is connected to the transmission shaft.

In the hybrid vehicle as described above, while the first motor generates electric power by receiving a part of a driving force of the engine, it generates a reaction force in one of the rotation elements of the planetary gear. At the same time, a residual driving force is output to the transmission shaft via the rotation element of the planetary gear where the reaction force is generated. Further, the driving force from the second motor can be output to the transmission shaft. More specifically, control of the first motor enables (i) non-stepped control of a rotational speed of the engine and (ii) drive of the engine in an efficient region. At the same time, control of the second motor enables output to the drive wheels to be controlled. In other words, control of the first and second motors enables output to the engine to be driven efficiently and the driving force to be output to the drive wheels in accordance with an output requested by a driver (hereinafter referred to as "driver request output").

Further, in the conventional hybrid vehicle as described above, the second motor is coupled to the drive wheels, that is, a rotational speed of the second motor increases as a vehicle speed increases. In general, when a motor rotates at a high speed, an output of the motor decreases as the rotational speed increases. For example, when the above vehicle is driving in a middle-to-high-speed range, the rotational speed of the second motor becomes high, and the output of the second motor decreases. Further, a vehicle requiring a large output (such as engine displacement of 3000 or 4000 cc) also requires a large capacity (or output) of the second motor. Therefore, in order to respond to a request for a larger output at a high rotational speed of the motor, the size of the second motor needs to be increased, which impairs mountability in the vehicle.

SUMMARY OF THE INVENTION

In order to solve the problems above, a stepped transmission may be installed between the second motor and the transmission shaft. For example, if it is possible to change the rotational speed of the second motor between the low-to-medium speed range and the middle-to-high speed range, the second motor can be used at a low rotational speed. Further, the size of the second motor can be reduced, thereby improving mountability in the vehicle.

However, when shifting is executed using the aforementioned stepped transmission, a change in the rotational speed is generated. Particularly, inertial torque (inertial force) is generated in the second motor where the rotational speed changes. Accordingly, the driving force output to the drive wheels changes during shifting, which may cause the driver to feel a sense of discomfort.

Therefore, an object is to provide a control system for a hybrid vehicle that is capable of absorbing an inertial force generated during shifting of a stepped transmission.

In the control system to be described in greater detail, during shift control of a stepped transmission by shift control means and before the shift control is completed, during-shift drive control means controls a driving force output from a second drive unit such that a driving force output to drive wheels from a first and second drive units equals a driver request output. Further, the during-shift drive control means executes control so as to reduce a difference between the driving force output to the drive wheels and the driver request output based on a change in a transmission force of the stepped transmission caused by switch-over of a plurality of friction engagement elements. Moreover, in an inertial phase of the switch-over of the plurality of friction engagement elements, second motor control means which is included within the during-shift drive control means executes control such that a second motor absorbs an inertial force caused by a change of a ratio of a rotational speed of the second motor with respect to a rotational speed of the drive wheels.

The control system is capable of outputting the driver request output from the first and second drive units to the drive wheels when the shift control is completed, and reducing a change in the driving force during shifting. This change in the driving force is caused by a change in the transmission force of the stepped transmission due to the switch-over of the plurality of the friction engagement elements during shifting of the stepped transmission. At the same time, a change in the driving force output to the drive wheels caused by a change in the inertial force in the inertial phase during shifting, can be eliminated.

BRIEF DESCRIPTION OF THE DRAWINGS

The invention will be described with reference to the drawings in which.

DETAILED DESCRIPTION OF PREFERRED EMBODIMENTS

Figure 1:
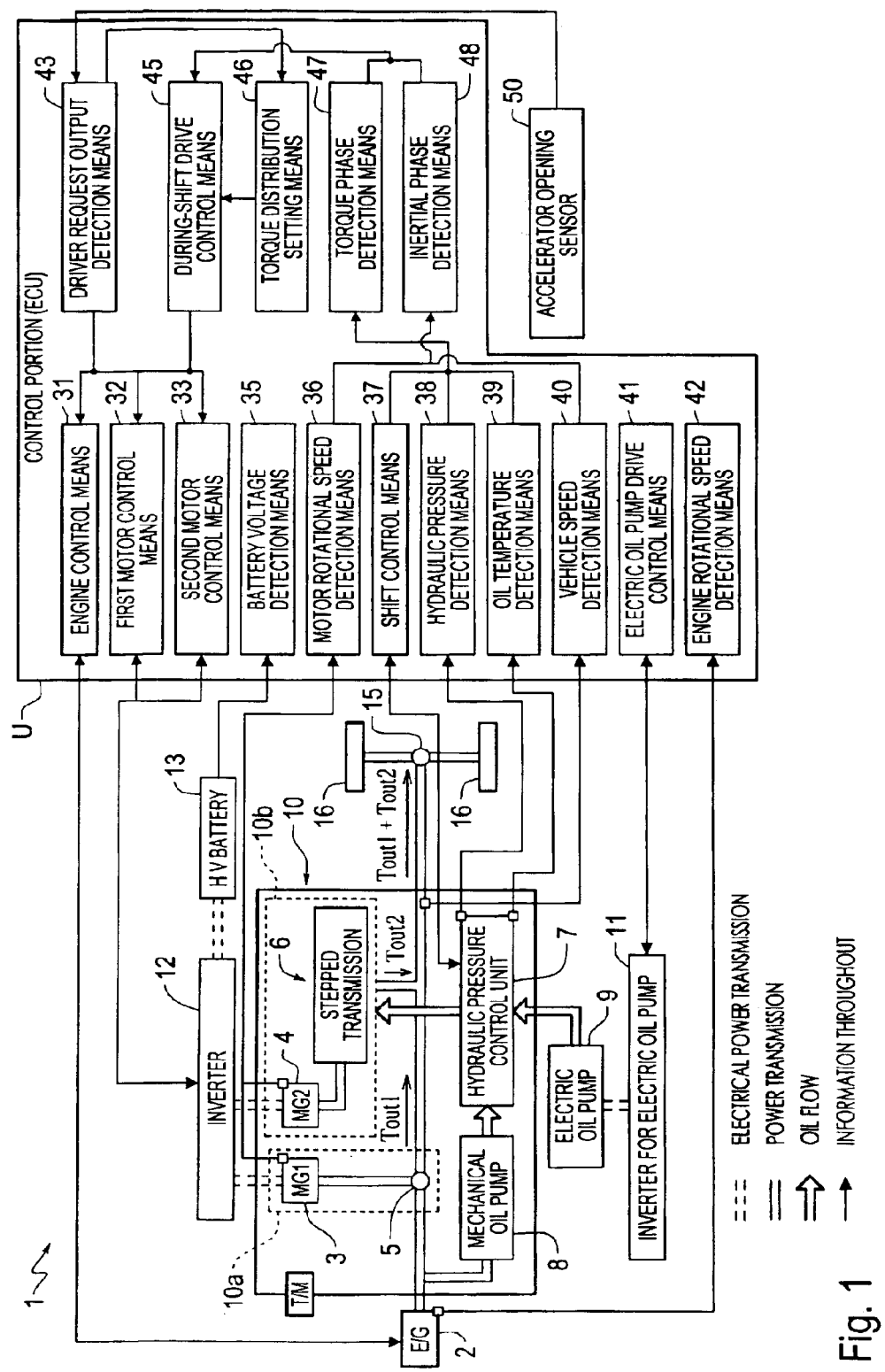
FIG. 1 is a schematic diagram of a control system for a hybrid vehicle.

Hereinafter, an exemplary embodiment will be explained with reference to the drawings. As shown in FIG. 1, the hybrid vehicle is configured as a parallel hybrid of a two-motor split type. The hybrid vehicle is provided with an engine 2 capable of outputting a driving force, a transmission 10 connected to the engine 2, and drive wheels 16, 16 connected to the transmission 10 via a differential unit 15.

The transmission 10 is provided with a first drive unit 10a and a second drive unit 10b serving as a unit for outputting the driving force to the drive wheels 16, 16. The first drive unit 10a has a planetary gear 5, for power distribution, connected to the engine 2 via a damping apparatus (not shown) or the like, and a first motor 3 connected to the planetary gear 5. The first drive unit 10a is connected to a transmission shaft 21 via the planetary gear 5 for power distribution. Moreover, the second drive unit 10b has a second motor 4 and a stepped transmission 6 which is interposed between the second motor 4 and the transmission shaft 21. The second drive unit 10b is connected to the transmission shaft 21.

Figure 2A:
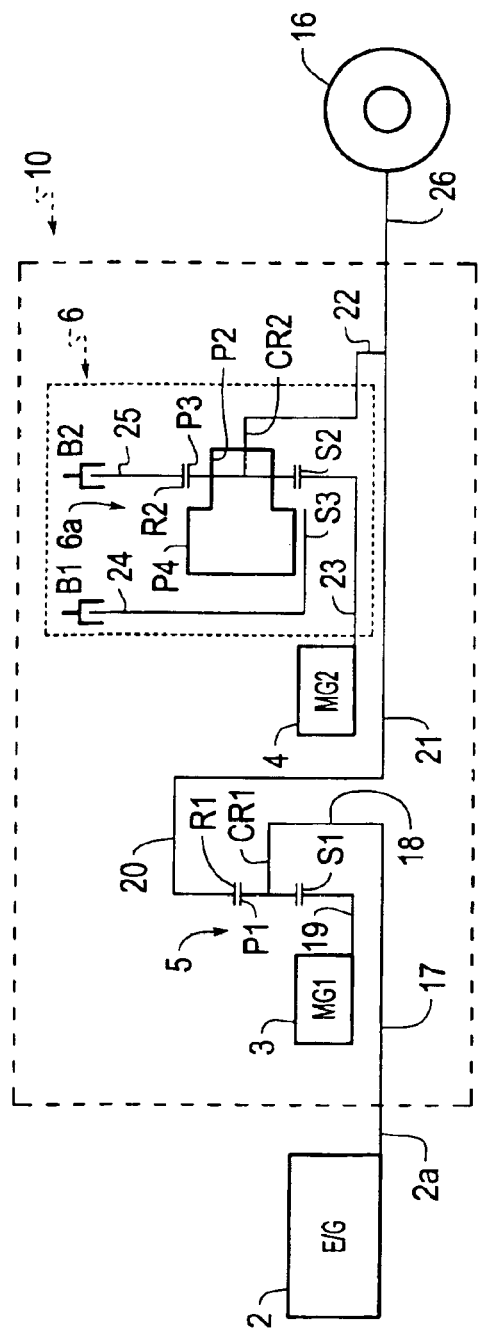
FIG. 2A is a schematic view of a drive train of the hybrid vehicle.

More specifically, as shown in FIG. 2A, an input shaft 17 of the transmission 10 is connected to a crank shaft 2a of the engine 2 via the damping apparatus (not shown). A carrier CR1 of the planetary gear 5, which is a simple planetary gear, is connected to the input shaft 17 via a hub member 18. The carrier CR1 has a pinion P1 rotatably supported by a side plate (not shown). A sun gear S1 is meshed with the pinion P1 and connected to a rotor shaft 19 of the first motor 3. Furthermore, a ring gear R1 is meshed to the pinion P1. The ring gear R1 is connected to a drum-shaped supporting member 20 which connects the ring gear R1 to the transmission shaft 21.

The stepped transmission 6 is connected to a rear endside (i.e., the right side in the drawing) of the transmission shaft 21. The stepped transmission 6 has a planetary gear unit 6a. Specifically, a carrier CR2 (second rotation element) of the planetary gear unit 6a is connected to the transmission shaft 21 via a hub member 22. The carrier CR2 has a long pinion P2, P4 rotatably supported by a side plate (not shown) and a short pinion P3 (hereinafter simply referred to as a "pinion P3"). The pinion P2 corresponds to a small diameter portion and the pinion P4 corresponds to a large diameter portion that integrally form the long pinion P2, P4. The pinion P2 corresponding to the small diameter portion meshes with the pinion P3.

The pinion P3 meshes with sun gear S2 (first rotation element), and the sun gear S2 is connected to a rotor shaft 23 of the second motor 4. Further, the pinion P4 meshes with a sun gear S3 (third rotation element) and the sun gear S3 is connected to a hub member 24. The hub member 24 is splined with a friction plate of a first brake B1. The first brake B1 is a multiple disc brake, and can be engaged when a hydraulic pressure is supplied to a hydraulic servo thereof (not shown). Further, the pinion P3 meshes with the ring gear R2 (fourth rotation element), and the ring gear R2 is connected to a hub member 25. The hub member 25 is splined with a friction plate of a second brake B2. The second brake B2 is a multiple disc brake, and can be engaged by application of hydraulic pressure to the hydraulic servo thereof (not shown).

Further, the transmission shaft 21 is connected to an output shaft 26 of the transmission 10. The output shaft 26 is coupled to the differential unit 15 via a coupling, and a propeller shaft (which are not shown), and other members, and is further connected to the drive wheels 16, 16 via right and left drive axles (see FIG. 1).

Moreover, as shown in FIG. 1, the transmission 10 is provided with a mechanical oil pump 8 and a hydraulic pressure control unit 7. The mechanical oil pump 8 is connected to the input shaft 17 (or the crank shaft 2a of the engine 2) and is operationally linked to the engine 2. The hydraulic pressure control unit 7 receives a hydraulic pressure from the mechanical oil pump 8, and is capable of supplying lubricant and cooling oil and a hydraulic pressure for the aforementioned two hydraulic servos of the stepped transmission 6, and the second motor 4.

Further, the hybrid vehicle is provided with an electric oil pump 9 driven independently of the mechanical oil pump 8. The electric oil pump 9 can be driven by supply of electric power from an inverter 11 for electric oil pump-use. The electric oil pump inverter 11 is controlled by electric oil pump drive control means 41 to be described later. When the engine 2 is in a stopped state, such as during an idling stop, the mechanical oil pump 8 that is operationally linked to the engine 2 is also stopped. Therefore, the electric oil pump 9 is mainly driven when the mechanical oil pump 8 is stopped, to secure the hydraulic pressure for the hydraulic pressure control unit 7.

The hybrid vehicle is further provided with an inverter 12 connected to the first motor 3 and the second motor 4 and an HV battery (a battery for driving the hybrid vehicle) 13 connected to the inverter 12. The first motor 3 and the second motor 4 are driven by the inverter 12 so as to be capable of power-regeneration or power-assisting (assisting the engine). The inverter 12 is controlled by first motor control means 32 and second motor control means 33 to be described later. The electric power generated by power-regeneration, or used in power-assistance can be charged to/supplied from the HV battery 13.

Next, power transmission of the hybrid vehicle will be explained with reference to FIGS. 1 and 2. As shown in FIG.

2A, when engine torque $T_E$ is output from the engine 2 as a driving force, it is input to the carrier CR1 of the planetary gear 5 for power distribution via the crank shaft 2a, the input shaft 17 and the hub member 18. On the other hand, when controlling first motor torque (hereinafter referred to as "MG1 torque") $T_{MG1}$ such that the first motor 3 regenerates (i.e., generates power), a part of the engine torque $T_E$ is distributed to the first motor 3. At the same time, the MG1 torque $T_{MG1}$ is transmitted, as a reaction force, via the rotor shaft 19 and the sun gear S1. Then, the ring gear R1 that receives the reaction force of the sun gear S1 is rotated, and the residual portion of the engine torque $T_E$ is distributed. In other words, a driving force output from the first drive unit 10a (hereinafter referred to as "first drive torque") $T_{OUT1}$ is output to the transmission shaft 21 (see FIG. 1).

Figure 2B:
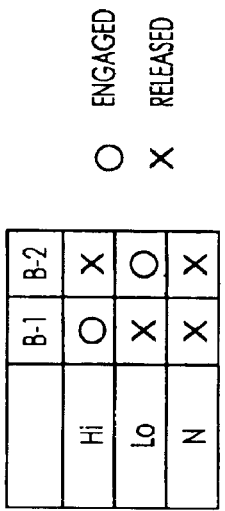
FIG. 2B is an engagement table.

Meanwhile, the hydraulic pressure control unit 7 receives a signal from shift control means 37, to be described later, and supplies hydraulic pressure for either the hydraulic servo of the first brake B1 or the hydraulic servo of the second brake B2. Accordingly, either the first brake B1 or the second brake B2 is engaged, and shifting of the stepped transmission 6 is executed. That is, as shown in FIGS. 2A and 2B, when the first brake B1 is engaged and the second brake B2 is released, the sun gear S3 is held stationary by the first brake B1. Thus, with the sun gear S3 held stationary and the sun gear S2 rotated in accordance with a rotational speed $N_{MG2}$ of the second motor 4, the stepped transmission 6 is in a high-speed stage (Hi) where the carrier CR2 is rotated at a high speed.

On the other hand, as shown in FIGS. 2A and 2B, when the second brake B2 is engaged and the first brake B1 is released, the ring gear R2 is held stationary by the second brake B2. Thus, with the ring gear R2 held stationary and the sun gear S2 rotated in accordance with a rotational speed $N_{MG2}$ of the second motor 4, the stepped transmission 6 is placed in a low-speed stage (Lo) where the carrier CR2 is rotated at a low speed.

Note that, when both the first brake B1 and the second brake B2 are released, both the sun gear S3 and the ring gear R2 idle. This places the stepped transmission 6 in a neutral state (N) where the rotation of the sun gear S2 (i.e., the rotational speed $N_{MG2}$ of the second motor 4) and the rotation of the carrier CR2 are not transmitted to each other.

When second motor torque $T_{MG2}$ (hereinafter referred to as "MG2 torque") is output from the second motor 4, it is transmitted to the sun gear S2 via the rotor shaft 23. The MG2 torque $T_{MG2}$ is output to the carrier CR2 and the hub member 22. In this case, the MG2 torque $T_{MG2}$ is relatively large when the stepped transmission 6 is in the low-speed stage (Lo), while it is relatively small when the stepped transmission 6 is in the high-speed stage (Hi). That is, a driving force $T_{OUT2}$ output from the second drive unit 10b (hereinafter referred to as "second drive torque") is output to the transmission shaft 21 (see FIG. 1).

Next, as shown in FIG. 1, the first drive torque $T_{OUT1}$ from the first drive unit 10a and the second drive torque $T_{OUT2}$ from the second drive unit 10b are output to the transmission shaft 21. In this case, the total drive torque $T_{OUT1}+T_{OUT2}$, which is the total of the first drive torque $T_{OUT1}$ and the second drive torque $T_{OUT2}$ (driving force output to the drive wheels), is output from the output shaft 26 of the transmission 10. This total drive torque $T_{OUT1}+T_{OUT2}$ is output to the differential unit 15, via the coupling and the propeller shaft (not shown) and the like. Further, it is further output from the differential unit 15 to the drive wheels 16, 16 via the right and left drive axles.

As described above, the stepped transmission 6 is capable of two-stage shifting between the high-speed stage (Hi) and the low-speed stage (Lo). Accordingly, the second motor 4 can be used at a low rotational speed, whereby the size required of the second motor 4 is reduced and mountability in the vehicle of the second motor 4 improves.

Next, the control system 1 for a hybrid vehicle will be explained with reference to FIG. 1. The control system 1 of the hybrid vehicle is provided with a control portion U (ECU). The control portion U includes engine control means 31, first motor control means 32, second motor control means 33, battery voltage detection means 35, motor rotational speed detection means 36, shift control means 37, hydraulic pressure detection means 38, oil temperature detection means 39, vehicle speed detection means 40, electric oil pump drive control means 41, engine rotational speed detection means 42, driver request output detection means 43, during-shift drive control means 45, torque distribution setting means 46, torque phase detection means 47, and inertial phase detection means 48.

The engine control means 31 is connected to the engine 2. The driving force of the engine 2, that is, the engine torque $T_E$, can be controlled by changing a throttle opening of the engine 2. The first motor control means 32 is connected to the inverter 12. The first motor control means 32 controls the inverter 12, thereby controlling (i) an electric power supply from and (ii) an electric charge to the HV battery 13. Accordingly, the driving force of the first motor 3, that is, the MG1 torque $T_{MG1}$, is controllable. In the same manner, the second motor control means 33 is also connected to the inverter 12. The second motor control means 33 controls the inverter 12, controlling (i) an electric power supply from and (ii) an electric charge to the HV battery 13. Accordingly, the driving force of the second motor 4, that is, the MG2 torque $T_{MG2}$ is controllable.

The battery voltage detection means 35 is connected to the HV battery 13 for detecting a voltage of the HV battery 13. Further, the motor rotational speed detection means 36 is connected to rotational speed sensors (not shown) which are respectively installed in the first motor 3 and the second motor 4, for detecting rotational speeds thereof. Detection of a voltage using the battery voltage detection means 35 enables detection of a state-of-charge (SOC) and various states of the HV battery 13 (as examples of the various states of the HV battery 13, a state-of-health (SOH) and the temperature of the HV battery 13 can be detected based on voltage drop). Thus, torque which can be output from the first motor 3 and the second motor 4 can be detected, based on the SOC and the various states of the battery, and the rotational speed detected by the motor rotational speed detection means 36.

The shift control means 37 is connected to, for example, a linear solenoid valve (not shown) for the first brake B1 and a linear solenoid valve (not shown) for the second brake B2 of the hydraulic pressure control unit 7. The shift control means 37 controls the linear solenoid valves, thereby controlling the hydraulic pressures of the hydraulic servo (not shown) of the first brake B1 and of the hydraulic servo (not shown) of the second brake B2. Accordingly, the shift control means 37 is able to selectively control whether the stepped transmission 6 is placed in the high-speed stage (Hi), the low-speed stage (Lo), or the neutral stage (N) as described above, and the switch-over between the first brake B1 and the second brake B2.

Moreover, the shift control means 37 has a shifting map (not shown) based on an accelerator opening (that is, the driver request output) and the rotational speed $N_{MG2}$ of the second motor 4. The accelerator opening is detected by an accelerator opening sensor 50, or the like, which is installed in the vicinity of a driver's seat (not shown). The shift control means 37 determines whether up-shifting or down-shifting needs to be executed, based on the relationship between the rotational speed $N_{MG2}$ of the second motor 4 and the output requested from the second motor 4 in accordance with the accelerator opening. For example, the shift control means 37 determines that up-shifting (shifting from the low-speed stage to the high-speed stage) needs to be executed when the rotational speed $N_{MG2}$ increases, while it determines that a down-shifting (shifting from the high-speed stage to the low-speed stage) needs to be executed when the rotational speed $N_{MG2}$ decreases. Further, it determines that up-shifting (shifting from the low-speed stage to the high-speed stage) needs to be executed when the output requested from the second motor 4 decreases, and it determines that down-shifting (shifting from the high-speed stage to the low-speed stage) needs to be executed when the output requested from the second motor 4 increases. Next, based on the determination as described above, the shift control means 37 executes shift control of the stepped transmission 6.

There are some cases where large torque cannot be output from the second motor 4 because of a small residual amount of charge of the HV battery 13. In this case, a determination is made only based on the shifting map. It is preferable that shifting be executed while preference is given to the state of the HV battery 13.

The hydraulic pressure detection means 38 is connected to the hydraulic pressure control unit 7, for detecting hydraulic pressures which are supplied from the linear solenoid valve for the first brake B1 and the linear solenoid valve for the second brake B2 to the hydraulic servo of the first brake B1 and the hydraulic servo of the second brake B2, respectively. The oil temperature detection means 39 detects an oil temperature of the hydraulic pressure control unit 7. Detection of the hydraulic pressures by the hydraulic pressure detection means 38 and detection of the oil temperature by the oil temperature detection means 39 enable detection (calculation) of a position of respective pistons (not shown) of the hydraulic servo of the first brake B1 and the hydraulic servo of the second brake B2. In other word, it is possible to detect an engagement state of the first brake B1 and an engagement state of the second brake B2.

The vehicle speed detection means 40 is connected to a rotational speed sensor (not shown) which is, for example, installed on the output shaft 26 of the transmission 10. The vehicle speed detection means 40 detects a vehicle speed based on the rotational speed of the output shaft 26. Based on the detection of the vehicle speed by the vehicle speed detection means 40, the shift control means 37 is capable of determining the type of shifting that the stepped transmission 6 needs to execute.

The electric oil pump drive control means 41 is connected to the electric oil pump inverter 11. It controls the electric oil pump inverter 11, thereby controlling an electric power supply from a battery (not shown). Accordingly, the electric oil pump drive control means 41 can control driving of the electric oil pump 9. The engine rotational speed detection means 42 is connected to a rotational speed sensor (not shown), which is installed, for example, on the crank shaft 2a of the engine 2. The engine rotational speed detection means 42 detects a rotational speed $N_E$ of the engine 2. When the rotational speed decreases, the hydraulic pressure in the mechanical oil pump 8 which is operationally linked to the engine 2 decreases. Therefore, when the engine rotational speed detection means 42 detects that the engine rotational speed $N_E$ is equal to or less than a predetermined rotational speed, in other words, when the hydraulic pressure of the mechanical oil pump 8 operationally coupled to the engine 2 is low, the electric oil pump drive control means 41 executes control so as to drive the electric oil pump 9, thereby supplying the hydraulic pressure to the hydraulic pressure control unit 7. Accordingly, a predetermined hydraulic pressure or higher is assured.

The driver request output detection means 43 is connected to the accelerator opening sensor 50 for detecting the accelerator opening of an accelerator pedal which is installed in, for example, the vicinity of the driver's seat (not shown). The driver request output detection means 43 detects (calculates) a driving force requested by the driver based on the accelerator opening.

The during-shift drive control means 45 executes a torque control for a first shift, which will be described later in detail. Specifically, the second motor control means 33 controls the total drive torque $T_{OUT1}+T_{OUT2}$ which is output to the drive wheels 16, 16 until the shift control of the stepped transmission 6 by the shift control means 37 is completed, such that the total drive torque $T_{OUT1}+T_{OUT2}$ equals the driver request output which is detected by the driver request output detection means 43. The torque distribution setting means 46 selects a torque control for each shift and sets the distribution thereof, as will be described later in detail.

The torque phase detection means 47 detects the engagement state of the first brake B1 and the engagement state of the second brake B2 based on a command output from the shift control means 37 to the linear solenoid valve of the hydraulic pressure control unit 7. Alternatively, the torque phase detection means 47 detects the engagement states based on the hydraulic pressures of the hydraulic servo of the first brake B1 and the hydraulic servo of the second brake B2 detected by the hydraulic pressure detection means 38, and the oil temperature detected by the oil temperature detection means 39. Based on these, the torque phase detection means 47 detects a torque phase of shifting in which switch-over between the first brake B1 and the second brake B2 takes place (hereinafter referred to a "switch-over").

Note that the torque phase refers to a state where, during switch-over between the first brake B1 and the second brake B2, only a ratio of torque distributed to the first brake B1 and torque distributed to the second brake B2 is reversed.

The inertial phase detection means 48 detects a change in the rotational speed of the second motor 4, based on (i) the rotational speed $N_{MG2}$ of the second motor 4 detected by the motor rotational speed detection means 36 and (ii) the vehicle speed (that is, rotational speeds of the output shaft 26 and the transmission shaft 21) detected by the vehicle speed detection means 40. Accordingly, the inertial phase detection means 48 detects an inertial phase of the switch-over between the first brake B1 and the second brake B2.

Note that the inertial phase refers to a state where, during switch-over between the first brake B1 and the second brake B2, inertial torque (inertial force) of the second motor 4 changes. The inertial torque changes due to a change in a gear ratio of the stepped transmission 6 and a change in the rotational speed of the second motor 4 with respect to the rotational speed of the output shaft 26 of the transmission 10.

Figure 3:
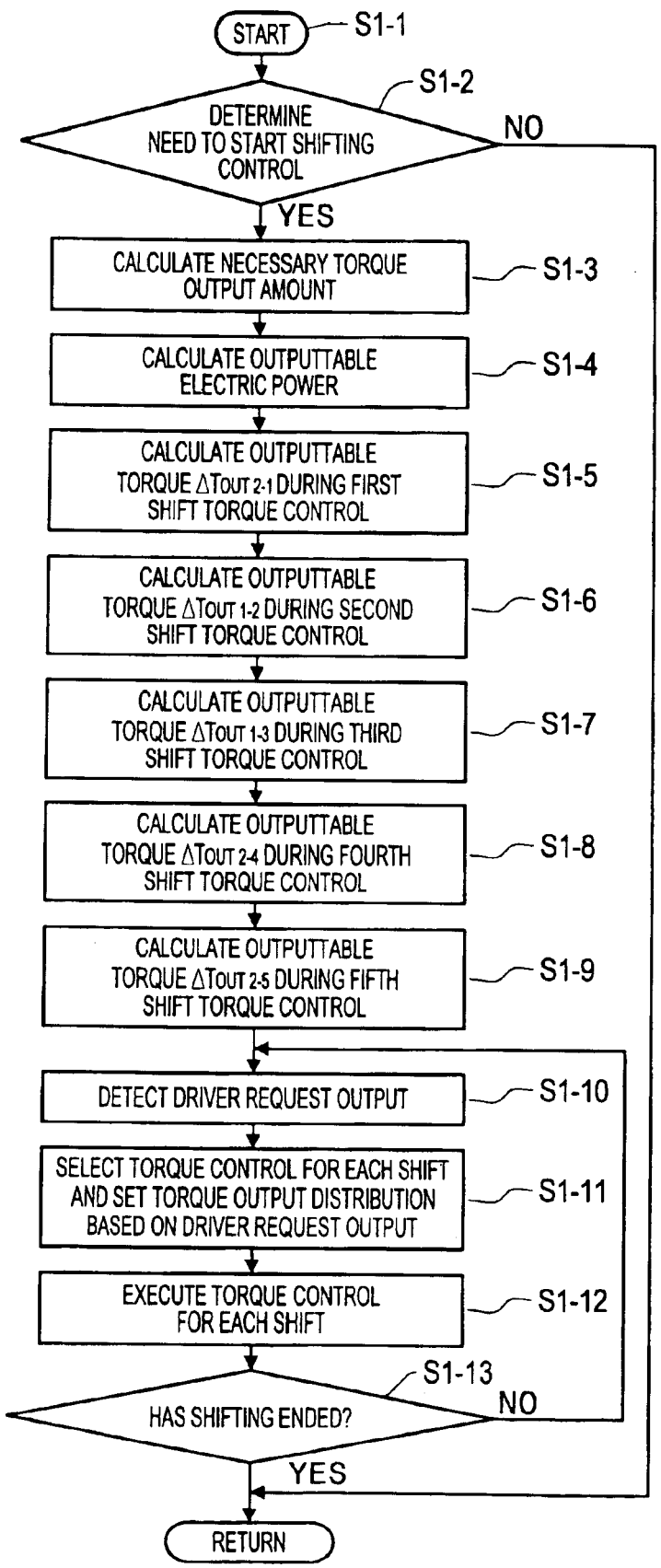
FIG. 3 is a flow chart showing selection of torque control for each shift and setting of torque output distribution.

Next, control of the control system 1 of the hybrid vehicle will be explained with reference to the drawings. FIG. 3 is a flow chart showing a selection of the torque control for each shift and control of torque output distribution setting. For example, when the driver turns on an ignition key (not shown) or the like, the torque distribution setting means 46 starts a control routine (S1-1) as shown in FIG. 3. When the shift control means 37 determines that shift control does not need to be started, that is, when shifting is not executed (No at S1-2), the routine returns to S1-1. The procedure is repeated until the shift control means 37 determines the need to start shift control.

For example, when the shift control means 37 determines the need to start shift control (including up-shifting and down-shifting) based on the aforementioned shifting map (not shown) (Yes at S1-2), the torque distribution setting means 46, at first, calculates an amount of the total drive torque $T_{OUT1}+T_{OUT2}$ (an amount of required torque output) required for the vehicle, in accordance with the driver request output and the vehicle speed (S1-3). The total drive torque $T_{OUT1}+T_{OUT2}$ is based on the reduction in torque transmission of the stepped transmission 6 that results from the switch-over between the first brake B1 and the second brake B2 of the stepped transmission 6. The torque distribution setting means 46 also receives a value detected by the battery voltage detection means 35, and the like, and uses the received information to calculate an electric power that can be output to the first motor 3 and the second motor 4.

Subsequently, the torque distribution setting means 46 calculates torque $\Delta T_{OUT2-1}$ that can be output by a torque control for a first shift, which will be described later (hereinafter referred to as "outputtable torque"). The outputtable torque $\Delta T_{OUT2-1}$ is based on the calculated required total drive torque $T_{OUT1}+T_{OUT2}$ and the electric power that can be output (S1-5). Moreover, in a similar manner, the torque distribution setting means 46 calculates outputtable torque $\Delta T_{OUT1-2}$ which can be output by a torque control for a second shift to be described later in detail (S1-6), outputtable torque $\Delta T_{OUT1-3}$ which can be output by a torque control for a third shift (S1-7), outputtable torque $\Delta T_{OUT2-4}$ which can be output by a torque control for a fourth shift (S1-8), and outputtable torque $\Delta T_{OUT2-5}$ which can be output by a torque control for a fifth shift (S1-9).

After the torque distribution setting means 46 completes calculation of the outputtable torque of the torque control for each shift, the driver request output detection unit 43 detects the driver request output (S1-10). Then, the torque distribution setting means 46 selects the torque control for the fifth shift and at least one of the torque control for the first shift to the torque control for the fourth shift, based on the driver request output and each calculated outputtable torque. Next, the torque distribution setting means 46 sets an amount of torque to be output by the torque control for the selected shift (S1-11). (Particularly, when the torque distribution setting means 46 selects a plurality of torque controls for shift, it sets the distribution of the torque to be output by the torque controls for the selected shift (S1-11)).

When one or both of the torque control for the second shift and the torque control for the third shift are selected from among the torque control for the first shift to the torque control for the fourth shift, it is preferable that the torque control for the first shift also be selected. Further, details about the reason will be explained later.

Next, when the torque control for each shift is selected at the aforementioned step S1-11, and the torque output distribution is set, the routine proceeds to step S1-12. At step S1-12, the during-shift drive control means 45 executes the torque control for each shift, to be described later. When the shift control means 37 has not completed the shift control (when No at S1-13), the routine returns to step S1-10. Therefore, for example, even when the driver changes the accelerator opening during shift control executed by the shift control means 37, that is, even when the driver changes the driver request output, selection of the torque control for each shift and setting of torque output distribution are executed repeatedly. Accordingly, even during shifting, an output that satisfies the driver request can be output.

Subsequently, when the shift control means 37 completes the shift control (Yes at S1-13), the routine returns to step S1-10. The procedure is repeated without executing any control until the shift control means 37 determines the need to start the next shift control of the stepped transmission 6.

Figure 4:
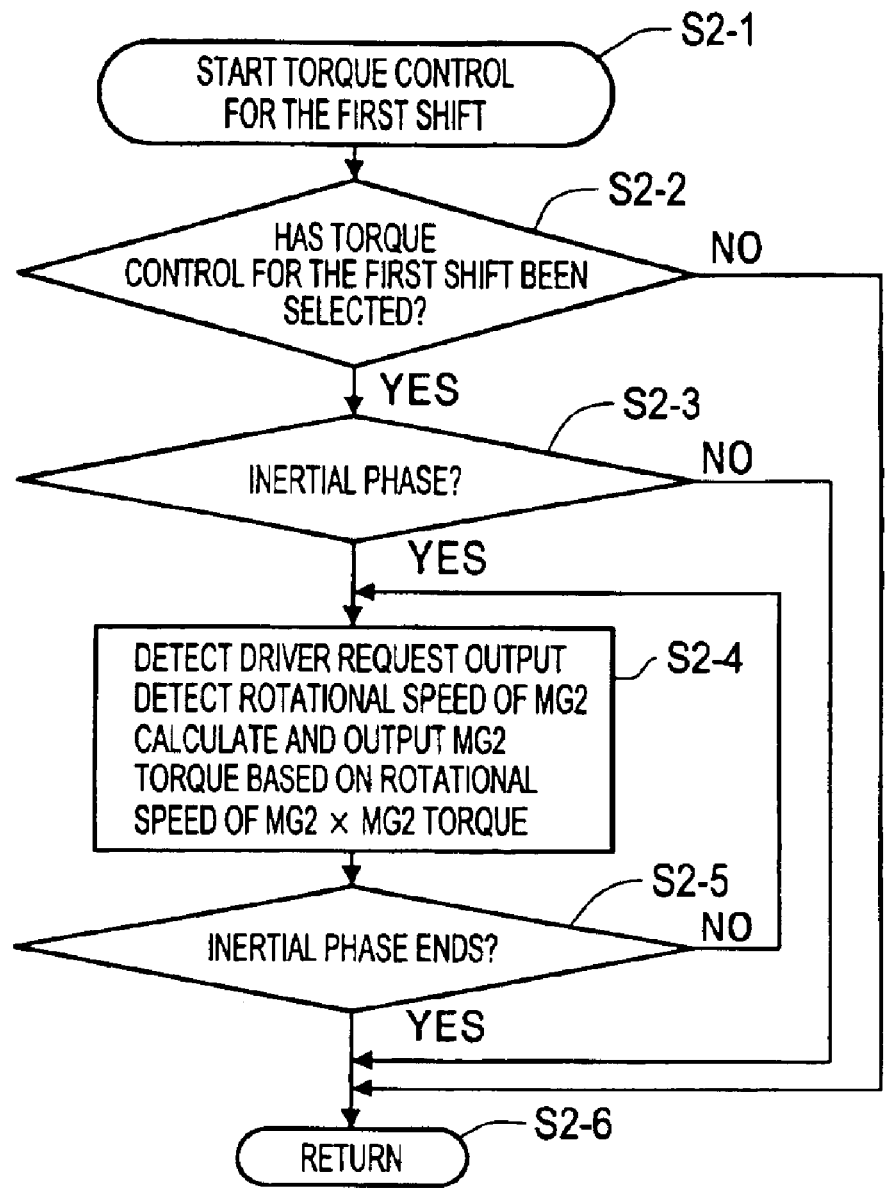
FIG. 4 is a flow chart showing a torque control for a first shift.
Figure 5:
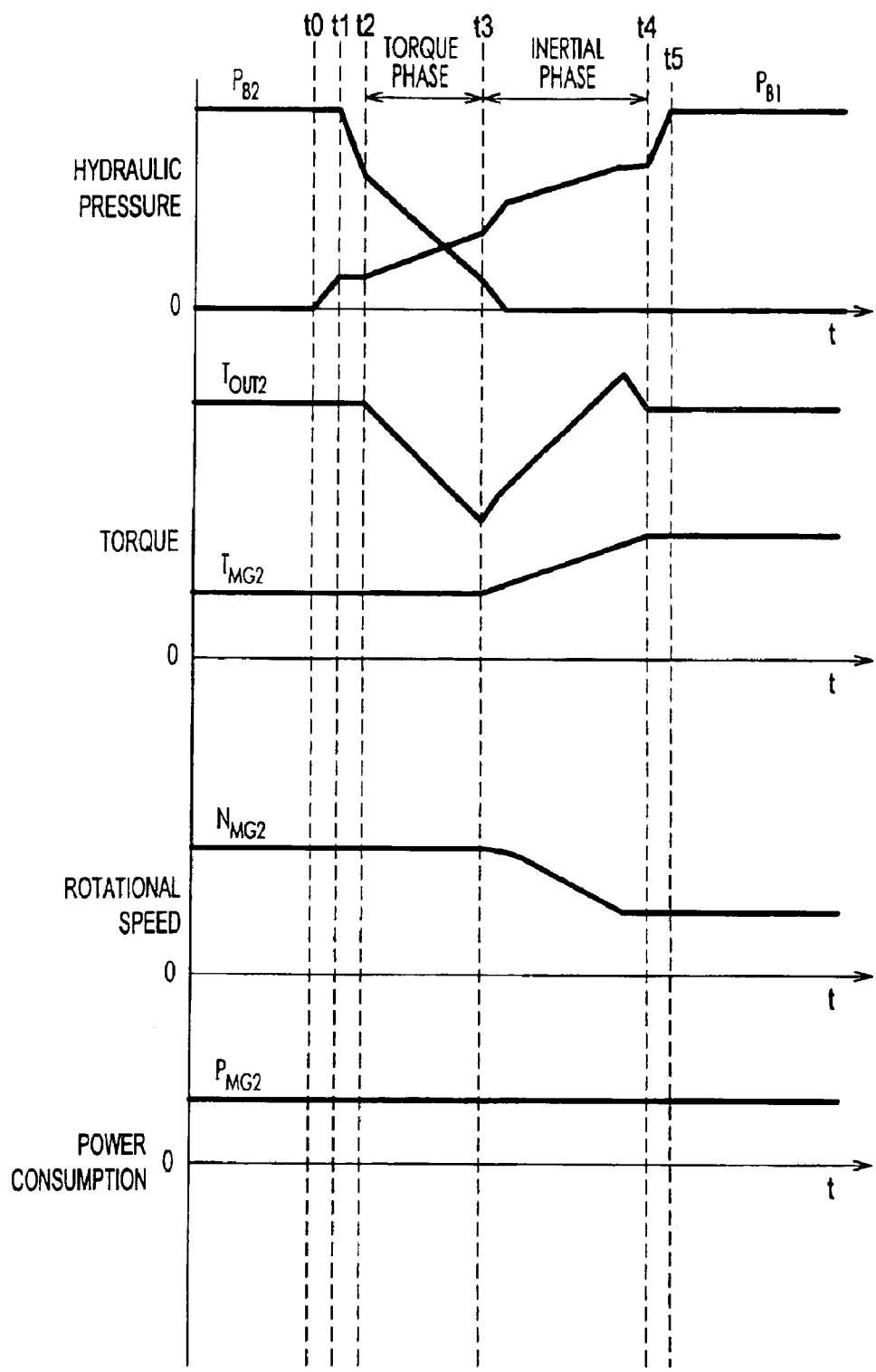
FIG. 5 is a time chart showing a case where the torque control for the first shift is executed while up-shifting.
Figure 6:
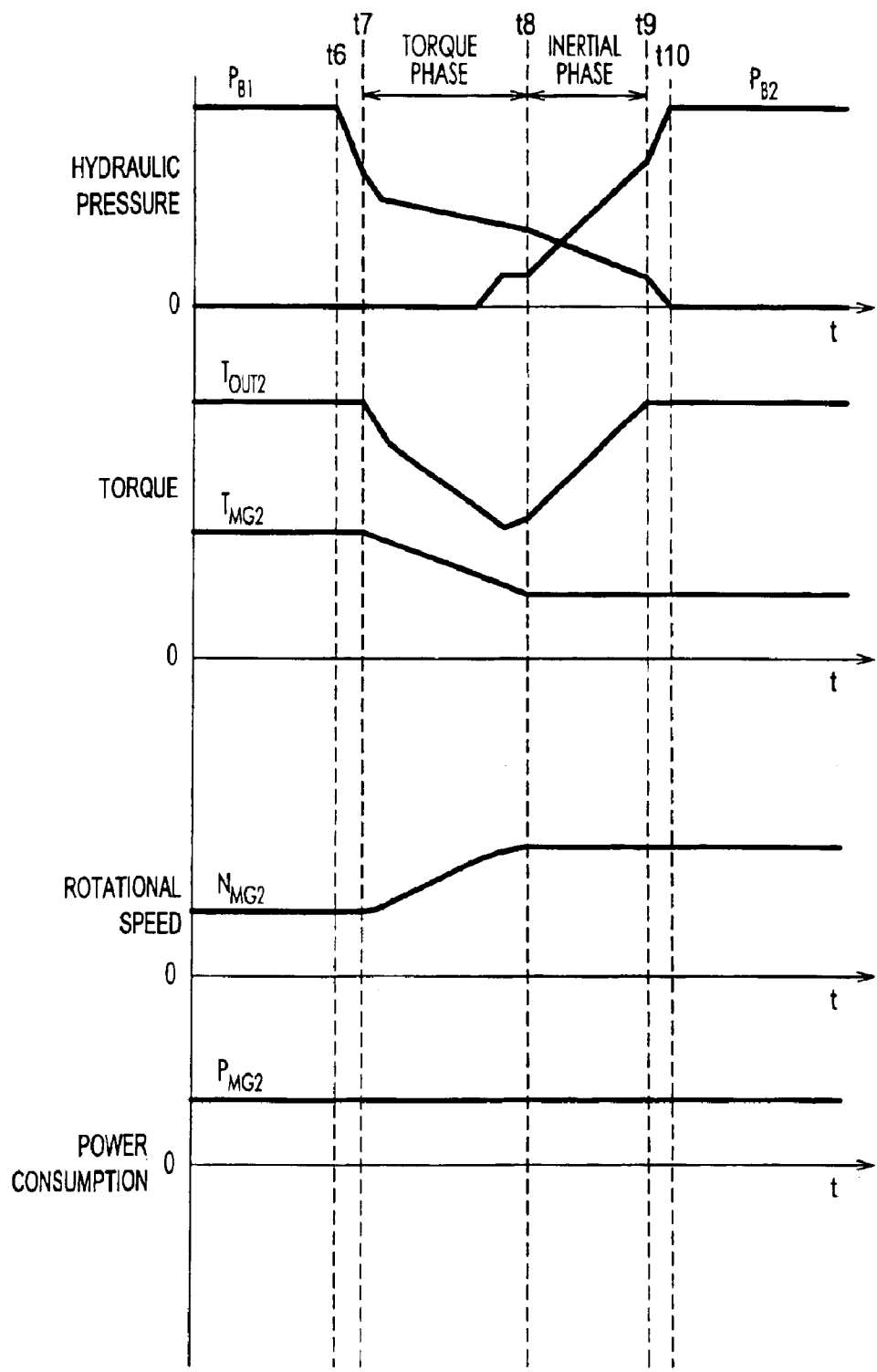
FIG. 6 is a time chart showing a case where the torque control for the first shift is executed while down-shifting.

Next, the torque control for the first shift will be explained with reference to FIGS. 4 to 6. FIG. 4 is a flow chart showing the torque control for the first shift, FIG. 5 is a time chart showing a case where the torque control for the first shift is executed while up-shifting, and FIG. 6 is a time chart showing a case where the torque control for the first shift is executed while down-shifting.

For example, when only shifting of the stepped transmission 6 is executed, the output from the second motor 4 changes in stages from before to after shifting. Thus, there are cases where, after shifting, the output is temporarily unable to satisfy the driver request output, despite corrective control of the distribution of the outputs from the engine 2, the first motor 3 and the second motor 4 that have been calculated with a distribution that accords with the output requested by the driver after shifting. Accordingly, the driver feels a sense of discomfort. Therefore, the torque control for the first shift aims to output the driver request output to the drive wheels until shifting of the stepped transmission 6 is completed.

For example, when the torque distribution setting means 46 selects the torque control for the first shift and sets the torque output distribution (S1-11), the during-shift drive control means 45 executes the torque control for each shift (S1-12). After the torque control for the first shift is started as shown in FIG. 4 (S2-1), it is determined whether the torque control for the first shift has been selected by the torque distribution setting means 46 (Yes at S2-2). Note that when the torque control for the first shift is not selected (No at S2-2), the routine proceeds to step S2-6, and the procedure is repeated without executing any control until the torque control for the first shift is selected. Further, the during-shift drive control means 45 determines whether the current phase is the inertial phase of shifting (S2-3), based on the detection of the inertial phase detection means 48, that is, the rotational speed $N_{MG}$ of the second motor 4 and the vehicle speed (S2-3). When the current phase is not the inertial phase (No at S2-3), the routine proceeds to step S2-6 and returns in a similar manner to before.

When it is determined that the current phase is the inertial phase (Yes at S2-3), the routine proceeds to step S2-4. First, the driver request output detection means 43 which is included within the during-shift drive control means 45 detects the driver request output. Further, the motor rotational speed detection means 36 which is also included within the during-shift drive control means 45 detects the rotational speed $N_{MG2}$ of the second motor 4 in the inertial phase, that is, the rotational speed $N_{MG2}$ which is changing. Next, the during-shift drive control means 45 calculates the output requested by the second drive unit 10b based on the driver request output. Then it calculates the MG2 torque $T_{MG2}$ such that a product of the rotational speed $N_{MG2}$ of the second motor 4 and the MG2 torque $T_{MG2}$ becomes a predetermined value that accords with the requested output (in other words, when the requested output is a fixed value, the product of the rotational speed $N_{MG2}$ and the MG2 torque $T_{MG2}$ is a constant). Then, the during-shift drive control means 45 commands the second motor control means 33 to output the calculated MG2 torque $T_{MG2}$. In other words, the MG2 torque $T_{MG2}$ is output from the second motor 4.

Subsequently, the during-shift drive control means 45 executes the aforementioned control repeatedly in the inertial phase (at S2-4 and S2-5). When the inertial phase detection means 48 stops detecting the inertial phase, that is, when the inertial phase ends, the routine proceeds to step S2-6. In this case, because the phase is no longer the inertial phase, the control of step S2-4 ends. At the same time, the during-shift drive control means 45 also ends the torque control for the first shift.

Next, a case where the torque control for the first shift is executed while up-shifting will be explained with reference to FIG. 5. Note that in the time chart in FIG. 5, it is assumed that the accelerator opening and the driver request output are constant, and that the vehicle speed is substantially constant. As shown in FIG. 5, a hydraulic pressure $P_{B2}$ is supplied to the hydraulic servo of the second brake B2, which causes the second brake B2 to engage, and the stepped transmission 6 is in the low-speed stage (Lo). In the low-speed stage (Lo), the rotational speed $N_{MG2}$ accords with the gear ratio of the stepped transmission 6 and the vehicle speed, and the MG2 torque $T_{MG2}$ is output in accordance with the driver request output.

For example, at time point t0, the shift control means 37 determines the need to start up-shifting based on the shifting map (not shown) or the like, and the during-shift drive control means 45 starts the torque control for the first shift (S2-1). In this case, at the beginning, the shift control means 37 controls the hydraulic pressure control unit 7 (more specifically, the linear solenoid valve, not shown, thereof) so as to start increasing the hydraulic pressure $P_{B1}$ of the hydraulic servo of the first brake B1. Accordingly, the friction plate (not shown) of the first brake B1 moves closer to the piston of the hydraulic servo, that is, so called play elimination is executed. Next, at time point t1, the shift control means 37 controls the hydraulic pressure control unit 7 so as to start decreasing the hydraulic pressure $P_{B2}$ of the hydraulic servo of the second brake B2, thereby starting to ease pressurization of the friction plate by the piston of the hydraulic servo of the second brake B2.

Next, from time point t2, the shift control means 37 gradually decreases the hydraulic pressure $P_{B2}$ of the hydraulic servo of the second brake B2, and gradually increases the hydraulic pressure $P_{B1}$ of the hydraulic servo of the first brake B1. Accordingly, the transmission torque of the second brake B2 decreases. At the same time, the friction plate of the first brake B1 starts to engage (i.e., begins slipping (partial engagement) from a non-engaged state), whereby the transmission torque of the first brake B1 increases. Therefore, the transmission torque of the first brake B1 and the transmission torque of the second brake B2 replace each other. In other words, the current phase becomes the torque phase. In the torque phase, the transmission torque of the stepped transmission 6 is reduced. Therefore, if the MG2 torque $T_{MG2}$ of the second motor 4 is substantially constant, the second drive torque $T_{OUT2}$ output from the second drive unit 10b decreases.

At time point t3, when the ratio of the torque distributed to the first brake B1 and the torque distributed to the second brake B2 is reversed and the transmission torque of the second brake B2 decreases to substantially zero, the torque is transmitted by the first brake B1. Next, the shift control means 37 further increases the hydraulic pressure $P_{B1}$ of the hydraulic servo of the first brake B1. Accordingly, the first brake B1 gradually moves from the slipping state until it is engaged. At the same time, the stepped transmission 6 changes from the low-speed stage (Lo) to the high-speed stage (Hi). In accordance with this change, the rotational speed $N_{MG2}$ of the second motor 4 decreases. That is, the current phase becomes the inertial phase. Next, the inertial phase detection means 48 detects that the current phase is the inertial phase based on the vehicle speed and the change in the rotational speed $N_{MG2}$ of the second motor 4. Note that, after time point t3, the hydraulic pressure $P_{B2}$ of the hydraulic servo of the second brake B2 is bled, and the hydraulic pressure $P_{B2}$ decreases to substantially zero.

When the inertial phase detection means 48 detects that the current phase is the inertial phase, at first, the driver request output detection means 43, which is included within the during-shift drive control means 45, detects the driver request output (which is assumed to be constant herein). Then, the during-shift drive control means 45 detects the rotational speed $N_{MG2}$ of the second motor 4, and calculates the MG2 torque $T_{MG2}$ such that the product of the rotational speed $N_{MG2}$ and the MG2 torque $T_{MG2}$ is a predetermined (that is, a fixed) value. Then, the second motor control means 33 which is also included within the during-shift drive control means 45 executes control such that the second motor 4 outputs the calculated MG2 torque $T_{MG2}$ (S2-4).

Further, when the during-shift drive control means 45 executes the aforementioned control repeatedly from time point t3 to time point t4, the rotational speed $N_{MG2}$ of the second motor 4 decreases and the MG2 torque $T_{MG2}$ increases. Accordingly, when the first brake B1 becomes substantially fully engaged at time point t4, the second drive torque $T_{OUT2}$ from the second drive unit 10b accords with the driver request output. Note that in the inertial phase, because the rotational speed $N_{MG2}$ of the second motor 4 with respect to the rotational speed of the transmission shaft 21 (that is, the drive wheels 16) changes, an inertial force is generated in the stepped transmission 6 that accords with the change of the rotational speed, and torque that accords with the inertial force (hereinafter referred to as "inertial torque" is output from the second drive unit 10b). Therefore, as shown in FIG. 5, the second drive torque $T_{OUT2}$ from the second drive unit 10b decreases as the rotational speed $N_{MG2}$ converges to the high-speed stage, after increasing due to the inertial torque thereof. Subsequently, from time point t4 to time point t5 the shift control means 37 increases the hydraulic pressure $P_{B1}$ of the hydraulic servo of the first brake B1 to a hydraulic pressure required for full engagement. At time point t5 the shift control is completed.

From time point t3 to time point t4, as described above, the product of the rotational speed $N_{MG2}$ of the second motor 4 and the MG2 torque $T_{MG2}$ is a predetermined value that accords with the driver request output, and the driver request output is constant. Therefore, a power consumption $P_{MG2}$ of the second motor 4 is also substantially constant.

For example, suppose that the MG2 torque $T_{MG2}$ of the second motor 4 from time point t3 to time point t4 remains the same as before the start of shifting (i.e., before time point t0). In this case, the ratio of the torque distributed to the first brake B1 and the torque distributed to the second brake B2 remains reversed in the torque phase. In other words, the second drive torque $T_{OUT2}$ from the second drive unit 10b in the torque phase is substantially the same as that at time point t3. Therefore, the second drive torque $T_{OUT2}$ which does not satisfy the driver request output is output when shifting is completed (at time point t5). In this case, however, the during-shift drive control means 45 executes the torque control for the first shift while up-shifting as described above. The torque control increases the second drive torque $T_{OUT2}$ from the second drive unit 10b by the time shifting is completed (at time point t5) so as to output the second drive torque $T_{OUT2}$ in accordance with the driver request output. Accordingly, it is possible to prevent the driver from feeling a sense of discomfort.

Next, an example where the torque control for the first shift is executed while down-shifting will be explained with reference to FIG. 6. Note that, in the time chart in FIG. 6, it is also assumed that the accelerator opening and the driver request output are constant, and that the vehicle speed is substantially constant. As shown in FIG. 6, the hydraulic pressure $P_{B1}$ is supplied to the hydraulic servo of the first brake B1. That is, the first brake B1 is engaged, and the stepped transmission 6 is in the high-speed stage (Hi) as described above. Further, in the high-speed stage (Hi), the rotational speed $N_{MG2}$ of the second motor 4 accords with the gear ratio of the stepped transmission 6 and the vehicle speed. Also, the MG2 torque $T_{MG2}$ is output in accordance with the driver request output.

For example, at time point t6, the shift control means 37 determines the need to start the down-shifting based on the shifting map (not shown) or the like, and the during-shift drive control means 45 starts the torque control for the first shift (S2-1). In this case, at first, the shift control means 37 controls the hydraulic pressure control unit 7 (more specifically, the linear solenoid valve, not shown, thereof) so as to start decreasing the hydraulic pressure $P_{B1}$ of the hydraulic servo of the first brake B1, thereby starting to ease pressurization of the friction plate by the piston of the hydraulic servo of the first brake B1.

Next, at time point t7, the friction plate of the first brake B1 begins to slip. Then, the first brake B1 slips more and more until it is released, and the gear ratio of the stepped transmission 6 changes from the high-speed stage (Hi) to the low-speed stage (Lo). In accordance with this change, the rotational speed $N_{MG2}$ of the second motor 4 increases. That is, the current phase becomes the inertial phase. Then, the inertial phase detection means 48 detects that the current phase is the inertial phase based on the vehicle speed and the rotational speed $N_{MG2}$ of the second motor 4.

When the inertial phase detection means 48 detects that the current phase is the inertial phase, at first, the driver request output detection means 43, which is included within the during-shift drive control means 45, detects the driver request output (here, the driver request output is assumed to be constant); and the motor rotational speed detection means 36, which is also included within the during-shift drive control means 45, detects the rotational speed $N_{MG2}$ of the second motor 4. Then, the during-shift drive control means 45 calculates the MG2 torque $T_{MG2}$ such that the product of the rotational speed $N_{MG2}$ and the MG2 torque $T_{MG2}$ is a predetermined (that is, fixed) value. Next, the second motor control means 33, which is also included within the during-shift drive control means 45, executes control such that the second motor 4 outputs the MG2 torque $T_{MG2}$ (S2-4). Then, when the during-shift drive control means 45 executes this control repeatedly from time point t7 to time point t8, the rotational speed $N_{MG2}$ of the second motor 4 increases and the MG2 torque $T_{MG2}$ decreases.

Note that, in the inertial phase, the rotational speed $N_{MG2}$ of the second motor 4 changes with respect to the rotational speed of the transmission shaft 21 (that is, the drive wheels 16). Therefore, the inertial force generated in the stepped transmission 6 accords with the change of the rotational speed, and the second drive unit 10b outputs torque that accords with the inertial force (hereinafter referred to as "inertial torque"). Accordingly, as shown in FIG. 6, the second drive torque $T_{OUT2}$ from the second drive unit 10b increases as the rotational speed $N_{MG2}$ converges to the low-speed stage, after decreasing due to the inertial torque.

Before the inertial phase ends (i.e., before time point t8), the shift control means 37 controls the hydraulic pressure control unit 7 (more specifically, the linear solenoid valve, not shown, thereof) so as to increase the hydraulic pressure $P_{B2}$ of the hydraulic servo of the second brake B2. Accordingly, the friction plate (not shown) of the second brake B2 moves closer to the piston of the hydraulic servo. In other words, so called play elimination is executed.

Next, at time point t8, the shift control means 37 continues decreasing the hydraulic pressure $P_{B1}$ of the hydraulic servo of the first brake B1, and gradually increases the hydraulic pressure $P_{B2}$ of the hydraulic servo of the second brake B2. The transmission torque of the first brake B1 decreases, and the transmission torque of the second brake B2 increases. Accordingly, the transmission torque of the first brake B1 and the transmission torque of the second brake B2 replace each other. That is, the current phase becomes the torque phase. In the torque phase, the second brake B2 is gradually engaged, and the transmission torque of the stepped transmission 6 increases. Therefore, even when the MG2 torque $T_{MG2}$ of the second motor 4 is substantially constant as shown in FIG. 6, the second drive torque $T_{OUT2}$ output from the second drive unit 10b increases.

When the ratio of torque distributed to the first brake B1 and torque distributed to the second brake B2 is reversed at time point t9, the transmission torque of the first brake B1 decreases to substantially zero, and the torque is transmitted by the second brake B2. Next, the shift control means 37 further increases the hydraulic pressure $P_{B2}$ of the hydraulic servo of the second brake B2, and the hydraulic pressure $P_{B1}$ of the hydraulic servo of the first brake B1 is bled. Accordingly, the shift control is completed at time point t10.

For example, suppose that, from time point t7 to time point t8, the MG2 torque $T_{MG2}$ of the second motor 4 remains the same as before time point t6). In this case, distribution of torque between the brake B1 and the brake B2 is reversed in the subsequent torque phase, and the second drive torque $T_{OUT2}$ output from the second drive unit 10b is larger than that at time point t6. Accordingly, the second drive torque $T_{OUT2}$ that is output when shifting is completed (at time point t10) is different from the driver request output. In this case, however, the during-shift drive control means 45 executes the torque control for the first shift while down-shifting as described above. This torque control decreases the second drive torque $T_{OUT2}$ output from the second drive unit 10b by the time shifting is completed (at time point t10) so as to output the second drive torque $T_{OUT2}$ in accordance with the driver request output. Accordingly, it is possible to prevent the driver from feeling a sense of discomfort.

As described above, during shift control of the stepped transmission by the shift control means 37 and before the shift control is completed, the during-shift drive control means 45 executes the torque control for the first shift so as to control the second drive torque $T_{OUT2}$ output from the second drive unit 10b such that the driving force output from the first and second drive units 10a, 10b to the drive wheels 16, 16 equals the driver request output. Therefore, shifting using the stepped transmission 6 prevents high-speed rotation of the second motor and allows the size of the second motor to be reduced. At the same time, the control system is capable of outputting the driver request output from the first and second drive units 10a, 10b to the drive wheels 16, 16 when the shift control is completed, without changing the second drive torque $T_{OUT2}$ from the second drive unit 10b after shifting of the stepped transmission 6 is executed. Therefore, it is possible to prevent the driver from feeling a sense of discomfort.

Figure 7:
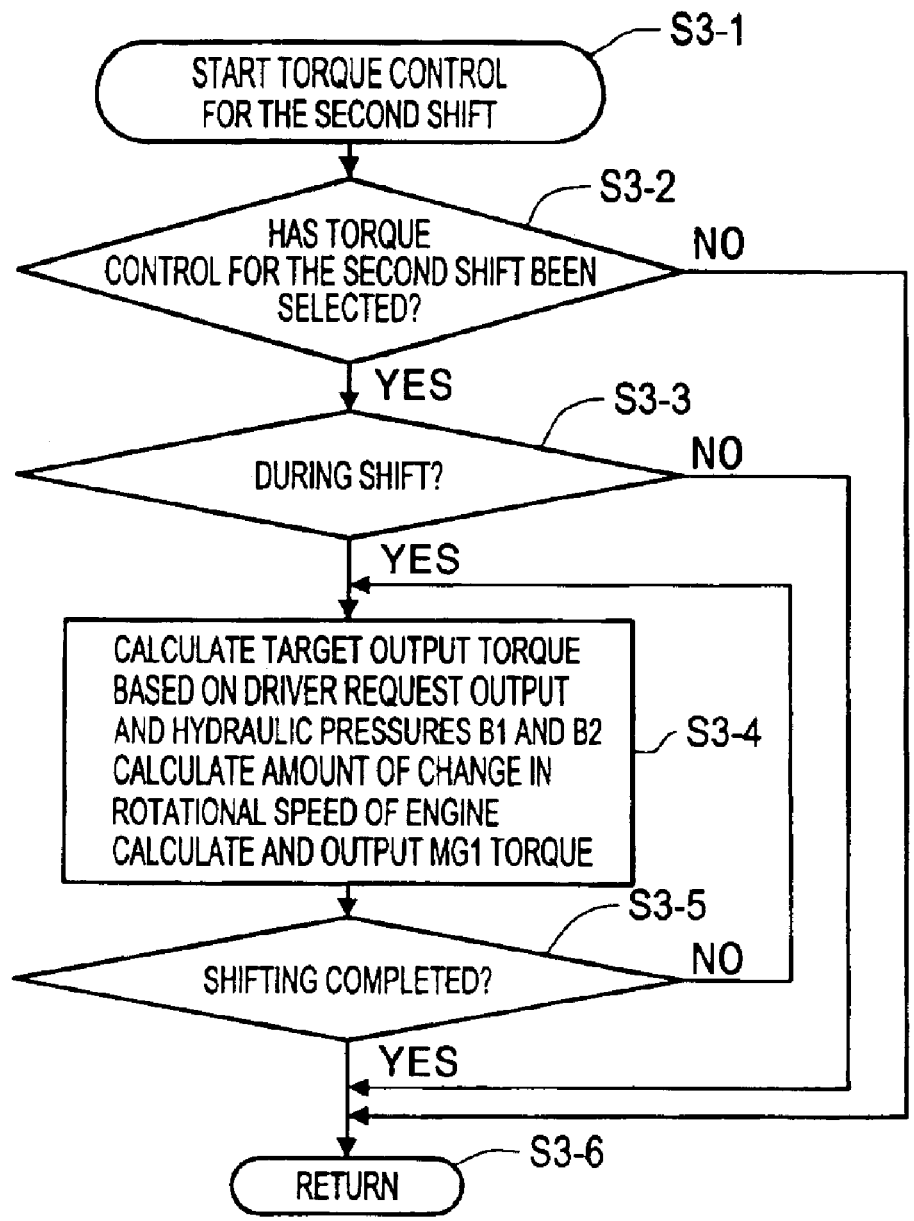
FIG. 7 is a flow chart showing a torque control for a second shift.
Figure 8:
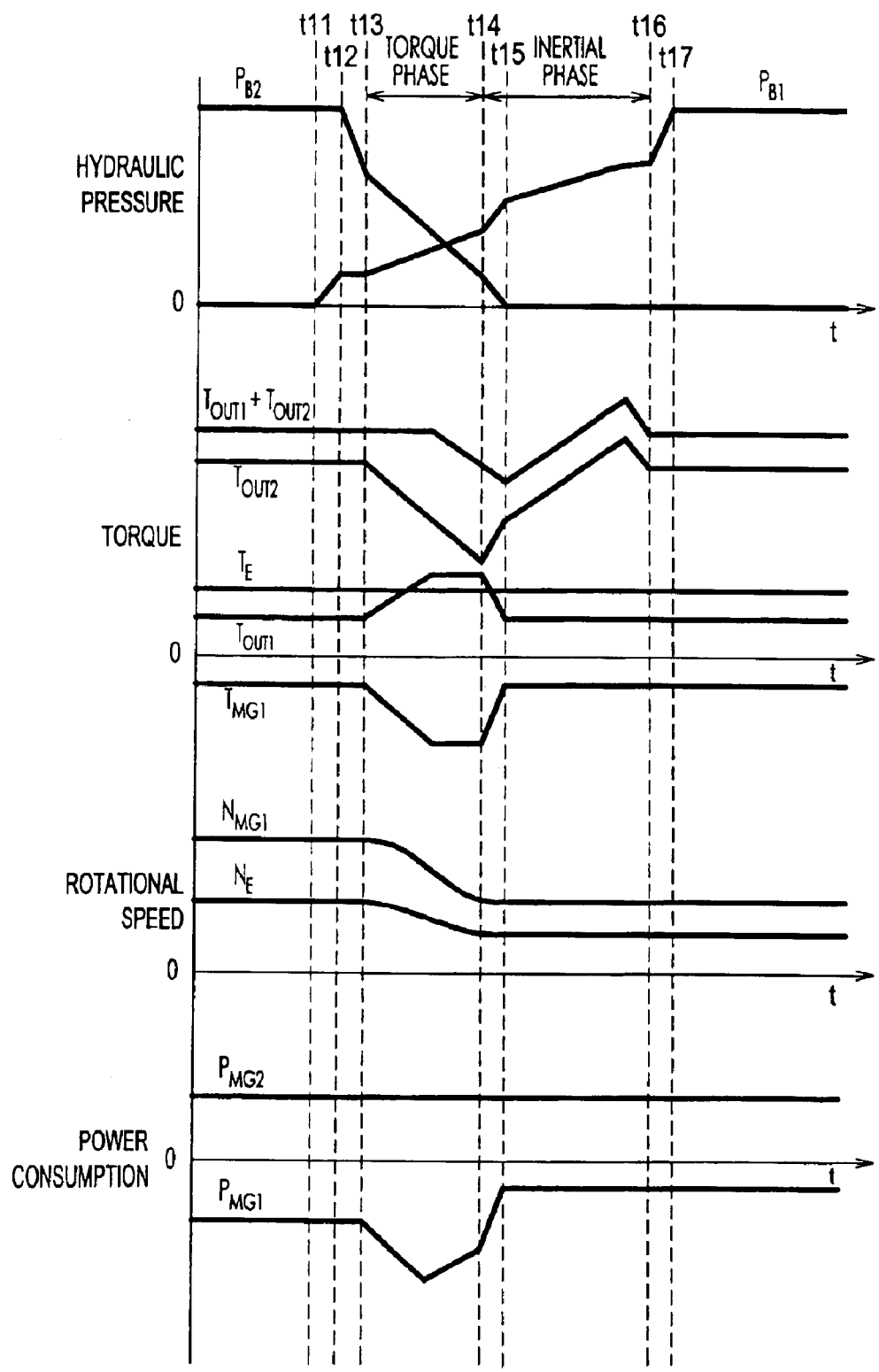
FIG. 8 is a time chart showing a case where the torque control for the first shift and the torque control for the second shift are executed while up-shifting.

Next, the torque control for the second shift will be explained with reference to FIGS. 7 and 8. FIG. 7 is a flow chart showing the torque control for the second shift, and FIG. 8 is a time chart showing a case where the torque control for the first shift and the torque control for the second shift are executed while up-shifting.

As is the case with an ordinary automatic transmission, shifting of the aforementioned stepped transmission 6 is executed by the switch-over of friction engagement elements, i.e., so called clutch-to-clutch shifting, between the first brake B1 and the second brake B2 as described above. While the switch-over of the friction engagement elements is executed, the friction engagement elements slip. In other words, the output that is transmitted temporarily decreases during shift. On the other hand, it is preferable that shifting of the stepped transmission 6 be automatically executed, based on the rotational speed $N_{MG2}$ of the second motor 4 or the like. (That is, it is preferable shifting be executed independently of the intention of the driver.)

However, in a hybrid vehicle that is not equipped with a stepped transmission between the second motor 4 and the output shaft 26, the rotational speed of the engine 2 can be continuously varied by the planetary gear 5 and the first motor 3, while the rotational speed of the second motor 4 is not changed. Accordingly, the output of the driving force is smoothly changed. Therefore, when shifting of the stepped transmission 6 is automatically executed, a change in the output occurs that the driver does not expect, which may cause the driver to feel a sense of discomfort. In order to address this problem, the torque control for the second shift, the torque control for the third shift and the torque control for the fourth shift, to be described later, aim to reduce a change in the output to the drive wheels 16 which is generated during shifting of the stepped transmission 6.

For example, when the torque distribution setting means 46 selects the torque control for the second shift and sets the torque output distribution (S1-11), the during-shift drive control means 45 executes the torque control for each shift (S1-12) (FIG. 3). As shown in FIG. 7, after the torque control for the second shift is started (S3-1), it is determined whether the torque control for the second shift has been selected by the torque distribution setting means 46 (Yes at S3-2). Note that, when the torque control for the second shift is not selected, the routine proceeds to step S3-6 and returns, and the procedure is repeated without executing any control until the torque control for the second shift is selected. Further, when the shift control is not executed by the shift control means 37 (No at S3-3), the during-shift drive control means 45 causes the routine to proceed to step S3-6, and returns in a similar manner to before.

At step S3-3, after it is determined that shift control is being executed (Yes at S3-3), the routine proceeds to step S3-4. First, the during-shift drive control means 45 calculates the target torque which is to be output from the first drive unit 10a. The target output torque accords with a change (decrease) in the torque from the second drive unit 10b generated due to shifting of the stepped transmission 6, in other words, the total drive torque $T_{OUT1}+T_{OUT2}$ of the vehicle accords with the driver request output. The target output torque is calculated based on the driver request output detected by the driver request output detection means 43, and the hydraulic pressures of the hydraulic servos of the first brake B1 and the second brake B2 which are set by the shift control means 37. (Note that, when the plurality of torque controls for shift are selected in step S1-11, in place of the driver request output, the target output torque may be calculated based on the torque output distribution. Further, alternatively, the hydraulic pressures may be detected by the hydraulic pressure detection means 38.)

Next, the during-shift drive control means 45 changes the rotational speed $N_E$ of the engine 2 in order to output the calculated target output torque from the first drive unit 10a. Then, it calculates an amount of change of the engine rotational speed which is required for outputting the inertial force from the engine 2. Next, the during-shift drive control means 45 calculates the MG1 torque $T_{MG1}$ of the first motor 3 such that the engine rotational speed equals the amount of change of the engine rotational speed. Further, the during-shift drive control means 45 commands the first motor control means 32 to output the calculated MG1 torque $T_{MG1}$. That is, the calculated MG1 torque $T_{MG1}$ is output from the first motor 3 (S3-4).

Subsequently, the during-shift drive control means 45 executes the aforementioned control repeatedly (S3-4 and S3-5), during shift control by the shift control means 37. When the shift control is completed, the routine proceeds to step S3-6 and returns. Note that, when the driver request output is changed (see S1-10 to S1-13) while control of the procedures of step S3-4 and step 3-5 are repeatedly executed, the during-shift drive control means 45 reflects the setting of the torque output distribution from the torque distribution setting means 46 and executes each calculation of step S3-4.

Next, an example where the torque control for the first shift and the torque control for the second shift are executed while up-shifting will be explained with reference to FIG. 8. Note that, in the time chart of FIG. 8, it is also assumed that the accelerator opening and the driver request output are constant, and that the vehicle speed is substantially constant. As shown in FIG. 8, the hydraulic pressure $P_{B2}$ is supplied to the hydraulic servo of the second brake B2, which causes the second brake B2 to engage, and the stepped transmission 6 is in the low-speed stage (Lo) as described above. Further, in the low-speed stage (Lo), the rotational speed $N_{MG2}$ of the second motor 4 accords with the gear ratio of the stepped transmission 6 and the vehicle speed, and the MG2 torque $T_{MG2}$ is output in accordance with the driver request output.

For example, at time point t11, when the shift control means 37 determines the need to start the up-shifting based on the shifting map (not shown) or the like, the torque distribution setting means 46 selects the torque control for each shift and the torque output distribution as described above (from S1-2 to S1-13). Then, in response to this, the during-shift drive control means 45 starts the torque control for the first shift and the torque control for the second shift (S2-1 and S3-1). Further, at time point t11, the shift control means 37 controls the hydraulic pressure control unit 7 (more specifically, the linear solenoid valve, not shown, thereof) so as to start increasing the hydraulic $P_{B1}$ of the hydraulic servo of the first brake B1, whereby the friction plate (not shown) of the first brake B1 moves closer to the piston of the hydraulic servo, that is, so called play elimination is executed. Further, at time point t12, the shift control means 37 controls the hydraulic pressure control unit 7 so as to start decreasing the hydraulic pressure $P_{B2}$ of the hydraulic servo of the brake B2, thereby starting to ease pressurization of the friction plate by the piston of the hydraulic servo of the second brake B2.

Next, from time point t13, the shift control means 37 gradually decreases the hydraulic pressure $P_{B2}$ of the hydraulic servo of the second brake B2, and gradually increases the hydraulic pressure $P_{B1}$ of the hydraulic servo of the first brake B1. Accordingly, the transmission torque of the second brake B2 decreases, and the transmission torque of the first brake B1 increases. At the same time, the friction plate of the first brake B1 starts to slip, whereby the transmission torque of the first brake B1 increases. Accordingly, the transmission torque of the first brake B1 and the transmission torque of the second brake B2 replace each other, while the current phase becomes the torque phase. In the torque phase, the transmission torque of the stepped transmission 6 is reduced. Therefore, when the MG2 torque $T_{MG2}$ of the second motor 4 is substantially constant, as shown in FIG. 8, the second drive torque $T_{OUT2}$ output from the second drive unit 10b decreases.

In response to the decrease of the second drive torque $T_{OUT2}$ which is output from the second drive unit 10b, the during-shift drive control means 45 calculates the target output torque of the first drive torque $T_{OUT1}$ which is to be output from the first drive unit 10a. Further, the during-shift drive control means 45 calculates the MG1 torque $T_{MG1}$ based on the calculated amount of change in the engine rotational speed, and outputs the MG1 torque $T_{MG1}$ from the first motor 3 (S3-4).

The rotational speed $N_E$ of the engine 2 decreases by continuously receiving the reaction force of the MG1 torque $T_{MG1}$ of the first motor 3, in other words, by continuous increase of the MG1 torque $T_{MG1}$ of the first motor 3. Therefore, this change of the rotational speed generates the inertial force, and the first drive torque $T_{OUT1}$ from the first drive unit 10a increases as shown in FIG. 8. Accordingly, the total drive torque $T_{OUT1}+T_{OUT2}$ output from the first drive unit 10a and the second drive unit 10b equals to the driver request output (i.e., becomes substantially constant). Further, because the engine rotational speed $N_E$ decreases, the rotational speed $N_{MG1}$ of the first motor 3 also decreases.

Note that, in the control as shown in FIG. 8, the torque control for the first shift and the torque control for the second shift are executed, and the torque control for the first shift is executed in the inertial phase. Therefore, the torque distribution setting means 46 sets the target output torque of the torque control for the second shift, and executes control such that the torque control for the second shift ends in the torque phase. Therefore, from time point t13 to time point t14, increase of the MG1 torque $T_{MG1}$ is suppressed midway, and the first drive torque $T_{OUT1}$ from the first drive unit 10a is suppressed to a substantially constant value. Accordingly, the total drive torque $T_{OUT1}+T_{OUT2}$ decreases slightly. Further, the power consumption $P_{MG1}$ of the first motor 3 decreases (that is, regeneration increases), when the MG1 torque $T_{MG1}$ generates the reaction force. Subsequently, when the MG1 torque $T_{MG1}$ becomes substantially constant, the power consumption $P_{MG1}$ starts increasing slightly, in accordance with the decrease in the rotational speed $N_{MG1}$.

At time point t14, when the ratio of torque distributed to the first brake B1 and torque distributed to the second brake B2 is reversed, and the transmission torque of the second brake B2 decreases to substantially zero, the torque is transmitted by the first brake B1. Then, the shift control means 37 further increases the hydraulic pressure $P_{B1}$ of the hydraulic servo of the first brake B1. Accordingly, the first brake B1 gradually moves from the slipping state until it is engaged, and the gear ratio of the stepped transmission 6 changes from the low-speed stage (Lo) to the high-speed stage (Hi). In accordance with this change, the rotational speed $N_{MG2}$ of the second motor 4 decreases. That is, the current phase becomes the inertial phase. Next, the inertial phase detection means 48 detects that the current phase is the inertial phase based on the vehicle speed and the change in the rotational speed $N_{MG2}$ of the second motor 4. Note that, after time point t14 until time point t15, the hydraulic pressure $P_{B2}$ of the hydraulic servo of the second brake B2 is bled, and the hydraulic pressure $P_{B2}$ decreases to substantially zero.

When the inertial phase detection means 48 detects that the current phase is the inertial phase, the during-shift drive control means 45 starts the aforementioned torque control for the first shift (S2-3), and detects the driver request output. At the same time, the during-shift drive control means 45 detects the rotational speed $N_{MG2}$ of the second motor 4, and calculates the MG2 torque $T_{MG2}$ such that the product of the rotational speed $N_{MG2}$ thereof and the MG2 torque $T_{MG2}$ is a predetermined (that is, a fixed) value. Then the second motor control means 33 executes control such that the second motor 4 outputs the MG2 torque $T_{MG2}$ (S2-4).

Further, when the aforementioned control is repeatedly executed from time point t14 to time point t1, the rotational speed $N_{MG2}$ of the second motor 4 decreases and the MG2 torque $T_{MG2}$ increases. When the first brake B1 becomes substantially fully engaged at time point t16, the second drive torque $T_{OUT2}$ from the second drive unit 10b accords with the driver request output. Further, from time point t14 to time point t15, in order to complete the torque control for the second shift, the during-shift drive control means 45 sets the target output torque of the first drive torque $T_{OUT1}$ from the first drive unit 10a in accordance with the driver request output. That is, because the driver request output is substantially the same, the during-shift drive control means 45 sets the target output torque such that the first drive torque $T_{OUT1}$ is substantially the same as that when shifting is started. Accordingly, at time point t15, the first drive torque $T_{OUT1}$ equals that before shifting is started. Note that, at time point t15, the power consumption $P_{MG1}$ of the first motor 3 increases, because the rotational speed $N_{MG1}$ thereof decreases.

Moreover, in this inertial phase, the rotational speed $N_{MG2}$ of the second motor 4 with respect to the rotational speed of the transmission shaft 21 (that is, the drive wheels 16) changes, the inertial force generated in the stepped transmission 6 accords with the change of the rotational speed (from time point t14 to time point t16), and the inertial torque is output from the second drive unit 10b. Therefore, the torque $T_{OUT2}$ from the second drive unit 10b decreases, as the rotational speed $N_{MG2}$ converges to the high-speed stage, after increasing due to the inertial torque thereof (i.e., at a time close to t16). Subsequently, from time point t16 to time point t17, the shift control means 37 increases the hydraulic pressure $P_{B1}$ of the hydraulic servo of the first brake B1 to the hydraulic pressure required for full engagement. Subsequently, the shift control is completed at time point t17 (S1-13).

Note that, between time point t11 to time point t17 (particularly from time point t14 to time point t16), there may be a case where the product of the rotational speed $N_{MG2}$ of the second motor 4 and the MG2 torque $T_{MG2}$ is equal to a predetermined value that accords with the driver request output, and the driver request output is constant. Even in this case, the power consumption $P_{MG2}$ of the second motor 4 is substantially constant.

As described above, in the torque phase (from time point t13 to time point t14), while the second drive torque $T_{OUT2}$ from the second drive unit 10b decreases, the torque control for the second shift controls the MG1 torque $T_{MG1}$ of the first motor 3 so as to generate the inertial force of the engine 2, whereby the first drive torque $T_{OUT1}$ of the first drive unit 10a increases. Therefore, even during shifting of the stepped transmission 6, it is possible to make the total drive torque $T_{OUT1}+T_{OUT2}$ of the vehicle approximately equal to the driver request output, thereby preventing the driver from feeling a sense of discomfort. Further, in the inertial phase (from time point t14 to time point t16), execution of the torque control for the first shift enables the second drive torque $T_{OUT2}$ from the second drive unit 10b to increase by the time shifting is completed (at time point t17), and the second drive torque $T_{OUT2}$ to be output in accordance with the driver request output. Accordingly, it is possible to prevent the driver from feeling a sense of discomfort.

The aforementioned torque control for the second shift only controls the first motor 3. Therefore, good response and controllability are achieved as compared with control in which the torque of the engine 2 is reduced or increased (see the torque control for the third shift, to be described later). Thus, it is possible make the total drive torque $T_{OUT1}+T_{OUT2}$ approximately equal to the driver request output in a comparatively effective manner.

Note that in this discussion, an example where the torque control for the second shift is executed only in the torque phase is explained. The invention is not limited to this example, and the torque control for the second shift may be also executed in the inertial phase. In other words, the torque control for the second shift may be executed at any time when shifting is being executed.

Further, an example where the torque control for the first shift and the torque control for the second shift are executed while up-shifting is explained above. However, it is needless to say that the torque control for the first shift and the torque control for the second shift may be executed while down-shifting. Execution of the torque control for the first shift in the inertial phase while down-shifting, and the torque control for the second shift during shifting enables the total drive torque $T_{OUT1}+T_{OUT2}$ of the vehicle to be made approximately equal to the driver request output, even when shifting of the stepped transmission 6 is executed. Accordingly, it is possible to prevent the driver from feeling a sense of discomfort.

Further, when the aforementioned torque control for the second shift is executed, the engine rotational speed $N_E$ changes as described above (that is, the rotational speed decreases during up-shifting), while the engine torque $T_E$ remains unchanged. Due to this, the engine 2 may deviate from the optimal fuel economy state. However, if the engine rotational speed $N_E$ is returned to its original state during shifting, an inertial torque of the engine 2 is generated. Therefore, it is preferable that the engine rotational speed $N_E$ is set so as to gradually return to the optimal fuel economy state after shifting is completed.

Figure 9:
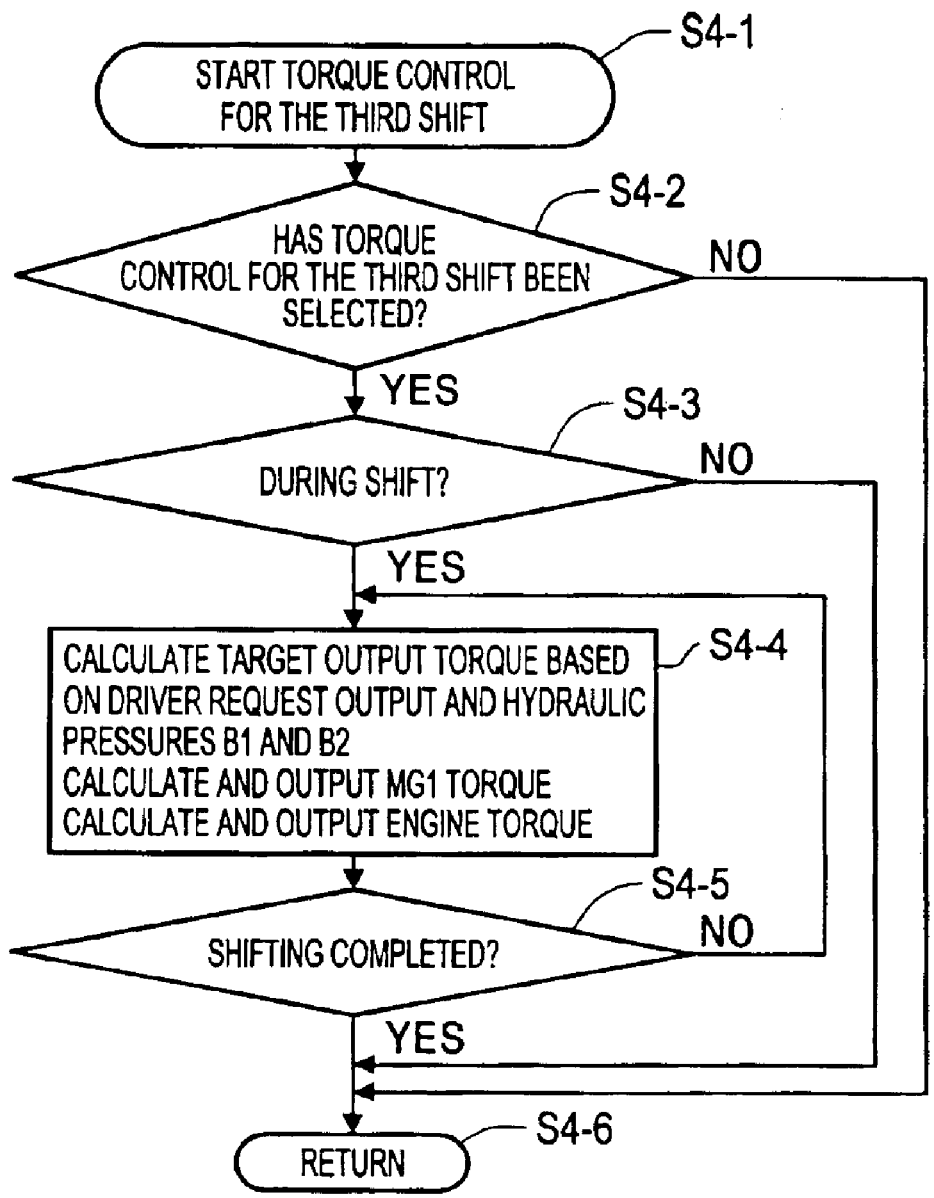
FIG. 9 is a flow chart showing a torque control for a third shift.
Figure 10:
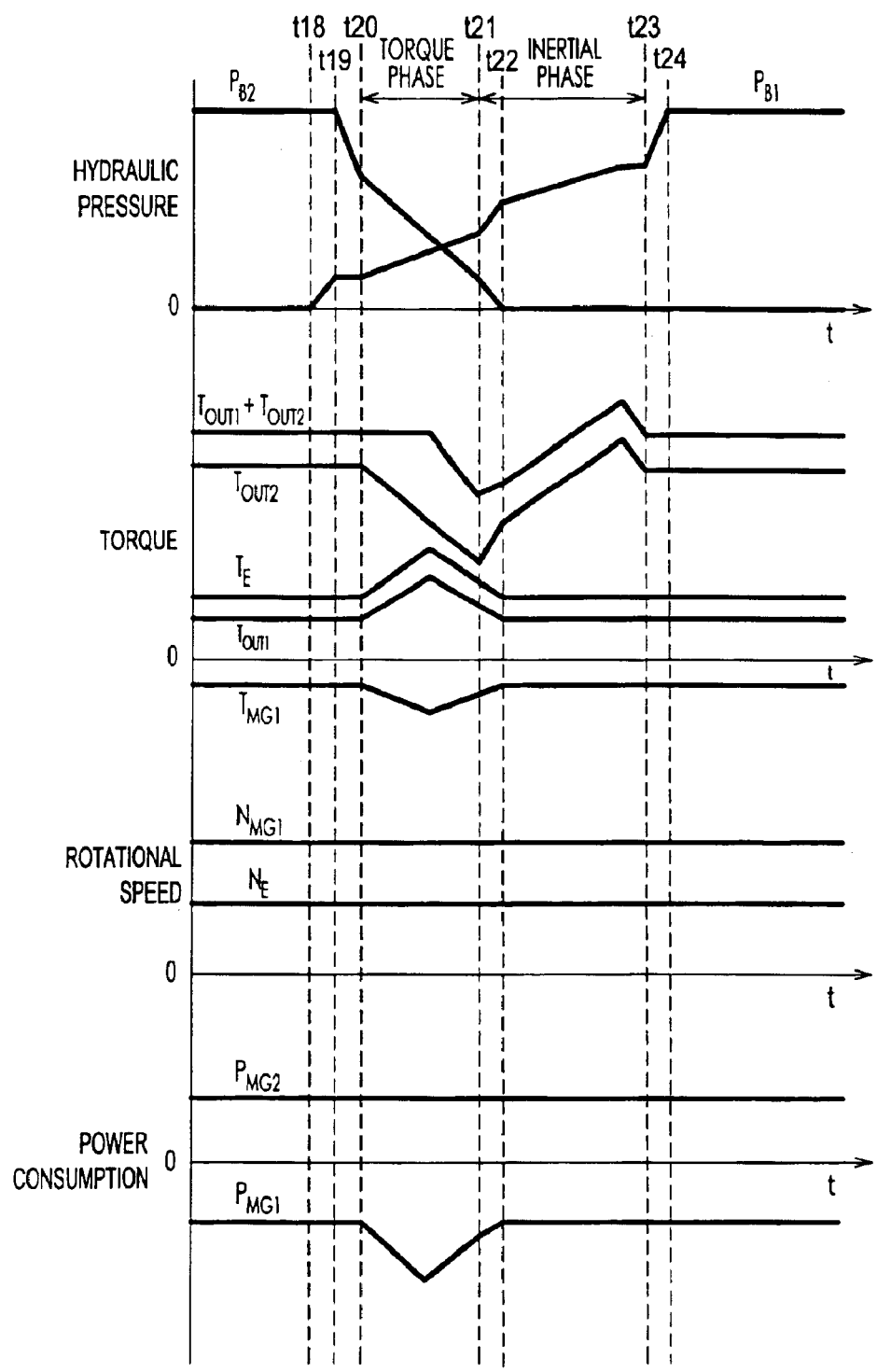
FIG. 10 is a time chart showing a case where the torque control for the first shift and the torque control for the third shift are executed while up-shifting.

Next, the torque control for the third shift will be explained with reference to FIGS. 9 and 10. FIG. 9 is a flow chart showing the torque control for the third shift, and FIG. 10 is a time chart showing a case where the torque control for the first shift and the torque control for the third shift are executed while up-shifting.

For example, when the torque distribution setting means 46 selects the torque control for the third shift, and sets the torque output distribution (S1-11), the during-shift drive control means 45 executes the torque control for each shift (S1-12). After the torque control for the third shift is started (S4-1), as shown in FIG. 9, the aforementioned torque distribution setting means 46 determines whether the torque control for the third shift has been selected (Yes at S4-2). Note that when the torque control for the third shift is not selected, the routine proceeds to step S4-7, and the procedure is repeated without executing any control until the time when the torque control for the third shift is selected. Further, when the shift control is not being executed by the shift control means 37 (No at S4-3), the routine proceeds to step S4-6 and returns in a similar manner as described immediately above.

At step S4-3, when it is determined that shift control is being executed (Yes at S4-3), the routine proceeds to step S4-4. Next, the during-shift drive control means 45 calculates the target output torque which is output from the first drive unit 10a. The target output torque accords with a change (decrease) in the torque from the second drive unit 10b generated due to shifting of the stepped transmission 6, in other words, the total drive torque $T_{OUT1}+T_{OUT2}$ of the vehicle accords with the driver request output. The target output torque is calculated based on the driver request output detected by the driver request output detection means 43, and the hydraulic pressures of the hydraulic servos of the first brake B1 and the second brake B2 which are set by the shift control means 37 (In this case, when the plurality of torque controls for shift are selected in step S1-11, in place of the driver request output, the target output torque may be calculated based on the torque output distribution. Further, alternatively, the hydraulic pressures may be detected by the hydraulic pressure detection means 38.).

Next, the during-shift drive control means 45 calculates the engine torque $T_E$ of the engine 2 which is required for outputting the calculated target output torque from the first drive unit 10a. The during-shift drive control means 45 calculates the MG1 torque $T_{MG1}$ of the first motor 3 which acts as a reaction force of the engine torque $T_E$. Next, the during-shift drive control means 45 commands the engine control means 31 to output the calculated engine torque $T_E$, and commands the first motor control means 32 to output the calculated MG1 torque $T_{MG1}$. That is, the calculated engine torque $T_E$ is output from the engine 2, and the calculated MG1 torque $T_{MG1}$ is output from the first motor 3 (S4-4).

Subsequently, the during-shift drive control means 45 executes the aforementioned control (S4-4 and S4-5) repeatedly, while the shift control means 37 is executing the shift control. When the shift control is completed, the routine proceeds to step S4-6 and returns. Note that when the driver request output is changed while the control of step S4-4 and step S4-5 (see S1-10 to S1-13) is repeatedly executed, the during-shift drive control means 45 reflects the setting of the torque output distribution from the torque distribution setting means 46 and executes each calculation of step S4-4.

Next, an example where the torque control for the first shift and the torque control for the third shift are executed while up-shifting will be explained with reference to FIG. 10. In the time chart shown in FIG. 10, it is also assumed that the accelerator opening and the driver request output are constant, and that the vehicle speed is substantially constant.

As shown in FIG. 10, the hydraulic pressure $P_{B2}$ is supplied to the hydraulic servo of the second brake B2, which causes the second brake B2 to engage, and the stepped transmission 6 is in a low-speed stage (Lo) as described above. Also, in the low-speed stage (Lo), the rotational speed $N_{MG2}$ of the second motor 4 accords with the gear ratio of the stepped transmission 6 and the vehicle speed, and the MG2 torque $T_{MG2}$ is output in accordance with the aforementioned driver request output.

For example, at time point t18, when the shift control means 37 determines the need to start up-shifting based on the shifting map (not shown) or the like, the torque distribution setting means 46 selects the torque control for each shift and sets the torque output distribution (S1-2 to S1-13). In response to this selection and setting, the during-shift drive control means 45 starts the torque control for the first shift and the torque control for the third shift (S2-1 and S4-1). Further, at time point t18, the shift control means 37 controls the hydraulic pressure control unit 7 (more specifically, the linear solenoid valve, not shown, thereof) so as to start increasing the hydraulic pressure $P_{B1}$ of the hydraulic servo of the first brake B1. Accordingly, the friction plate (not shown) of the first brake B1 moves closer to the piston of the hydraulic servo, that is, so called play elimination is executed. Further, at time point t19, the shift control means 37 controls the hydraulic pressure control unit 7 so as to start decreasing the hydraulic pressure $P_{B2}$ of the hydraulic servo of the second brake B2, thereby starting to ease pressurization of the friction plate by the piston of the hydraulic servo of the second brake B2.

Next, from time point t19, the shift control means 37 gradually decreases the hydraulic pressure $P_{B2}$ of the hydraulic servo of the second brake B2, and gradually increases the hydraulic pressure $P_{B1}$ of the hydraulic servo of the first brake B1. Accordingly, the transmission torque of the second brake B2 decreases, and the friction plate of the first brake B1 starts to slip, whereby the transmission torque of the first brake B1 increases. Thus, the transmission torque of the first brake B1 and the transmission torque of the second brake B2 replace each other. That is, the current phase becomes the torque phase. In the torque phase, the transmission torque of the stepped transmission 6 is reduced. Therefore, when the MG2 torque $T_{MG2}$ of the second motor 4 is substantially constant, as shown in FIG. 10, the second drive torque $T_{OUT2}$ which is output from the second drive unit 10b decreases.

In response to the decrease of the second drive torque $T_{OUT2}$ which is to be output from the second drive unit 10b, the during-shift drive control means 45 calculates the target output torque of the first drive torque $T_{OUT1}$ which is to be output from the first drive unit 10a, and calculates the engine torque $T_E$ and the MG1 torque $T_{MG1}$ based on the calculated target output torque. Accordingly, the during-shift drive control means 45 outputs the engine torque $T_E$ from the engine 2 and outputs the MG1 torque $T_{MG1}$ from the first motor 3 (S4-4).

Accordingly, a throttle opening of the engine 2 increases based on the target output torque, and the engine torque $T_E$ also increases. Further, the MG1 torque $T_{MG1}$ that acts as the reaction force, increases (that is, the absolute value of the MG1 torque $T_{MG1}$ increases negatively from a negative value). Next, the first drive torque $T_{OUT1}$ from the first drive unit 10a increases as shown in FIG. 10, and the total drive torque $T_{OUT1}+T_{OUT2}$ from the first drive unit 10a and the second drive unit 10b becomes substantially equal to the driver request output (that is, becomes substantially a constant output). Note that the engine 2 and the first motor 3 are controlled such that only the torque thereof is changed, and the engine rotational speed $N_E$ and the rotational speed $N_{MG1}$ of the first motor 3 remain substantially constant, in accordance with the vehicle speed.

Further, in the control of FIG. 10, the torque control for the first shift and the torque control for the third shift are executed, and the torque control for the first shift is executed in the inertial phase. Therefore, the torque distribution setting means 46 sets the target output torque of the torque control for the third shift, and executes control such that the torque control for the third shift is completed in the torque phase (note that the torque control for the third shift may also be continued during shifting, in other words, it may also continue in the inertial phase). Accordingly, at a point between time point t20 and time point t21, the engine torque $T_E$ which increases until a midway point starts to decrease, and the MG1 torque $T_{MG1}$ which increases (negatively) until a midway point also starts to decrease (gets less negative). In accordance with the decrease of the engine torque $T_E$ and the MG1 torque $T_{MG1}$, the first drive torque $T_{OUT1}$ also decreases after increasing, whereby the total drive torque $T_{OUT1}+T_{OUT2}$ decreases slightly. Further, the power consumption $P_{MG1}$ of the first motor 3 decreases when the reaction force from the MG1 torque $T_{MG1}$ increases (that is, regeneration increases). Subsequently, the power consumption $P_{MG1}$ increases because the engine torque $T_E$ decreases and the reaction force of the MG1 torque $T_{MG1}$, decreases.

At time point t21, when the ratio of the torque distributed to the first brake B1 and the torque distributed to the second brake B2 is reversed, and the transmission torque of the second brake B2 decreases to substantially zero, the torque is transmitted by the first brake B1. Then, the shift control means 37 further increases the hydraulic pressure $P_{B1}$ of the hydraulic servo of the first brake B1. Accordingly, the first brake B1 gradually moves from the slipping state until it is engaged. The gear ratio of the stepped transmission 6 changes from the low-speed stage (Lo) to the high-speed stage (Hi). In accordance with this change, the rotational speed $N_{MG2}$ of the second motor 4 decreases, while the current phase becomes the inertial phase. Next, the inertial phase detection means 48 detects that the current phase is the inertial phase, based on the vehicle speed and the change in the rotational speed $N_{MG2}$ of the second motor 4. Note that after time point t21, the hydraulic pressure $P_{B2}$ of the hydraulic servo of the second brake B2 is bled and the hydraulic pressure $P_{B2}$ decreases to substantially zero.

When the inertial phase detection means 48 detects that the current phase is the inertial phase, the during-shift drive control means 45 starts the aforementioned torque control for the first shift (S2-3), and detects the driver request output. Further, the during-shift drive control means 45 detects the rotational speed $N_{MG2}$ of the second motor 4, and calculates the MG2 torque $T_{MG2}$ such that the product of the rotational speed $N_{MG2}$ and the MG2 torque $T_{MG2}$ equals a predetermined value (that is, a fixed value). Then, the second motor control means 33 executes control such that the second motor 4 outputs the MG2 torque $T_{MG2}$ (S2-4).

Further, while the aforementioned control is repeatedly executed from time point t21 to time point t23, the rotational speed $N_{MG2}$ of the second motor 4 decreases and the MG2 torque $T_{MG2}$ increases. At time point t23, when the first brake B1 becomes substantially fully engaged, the second drive torque $T_{OUT2}$ from the second drive unit 10b accords with the driver request output. Moreover, from time point t21 to time point t22, in order to complete the torque control for the third shift, the during-shift drive control means 45 sets the target output torque such that the first drive torque $T_{OUT1}$ from the first drive unit 10a accords with the driver request output. That is, because the driver request output is substantially constant, the during-shift drive control means 45 sets the target output torque such that the first drive torque $T_{OUT1}$ substantially equals that when shifting was started. Accordingly, at time point t22, the first drive torque $T_{OUT1}$ equals that before shifting is started.

Further, in this inertial phase, the rotational speed $N_{MG2}$ of the second motor 4 changes with respect to the rotational speed of the transmission shaft 21 (that is, the drive wheels 16). Therefore, the inertial force generated in the stepped transmission 6 accords with the change of the rotational speed thereof (from time point t21 to time point t23), and the inertial torque is output from the second drive unit 10b. Accordingly, as shown in FIG. 10, the second drive torque $T_{OUT2}$ from the second drive unit 10b decreases as the rotational speed $N_{MG2}$ converges to the high-speed stage, after increasing due to the inertial torque thereof. Subsequently, from time point t23 to time point t24, the shift control means 37 increases the hydraulic pressure $P_{B1}$ of the hydraulic servo of the first brake B1 to the hydraulic pressure required for full engagement, and the shift control is completed at time point t24 (S1-13).

Note that, from time point t18 to time point t24 (particularly from time point t21 to time point t23 ), as described above, the product of the rotational speed $N_{MG2}$ of the second motor 4 and the MG2 torque $T_{MG2}$ is a predetermined value that accords with the driver request output, and the driver request output is constant. Therefore, the power consumption $P_{MG2}$ of the second motor 4 is also substantially constant.

As described above, in the torque phase (from time point t20 to time point t21), while the second drive torque $T_{OUT2}$ from the second drive unit 10b decreases, control of the engine torque $T_E$ of the engine 2 and the MG1 torque $T_{MG1}$ of the first motor 3 is executed through torque control for the third shift, whereby the first drive torque $T_{OUT1}$ from the first drive unit 10a is increased. Therefore, it is possible to make the total drive torque $T_{OUT1}+T_{OUT2}$ of the vehicle approximately equal to the driver request output, even when shifting of the stepped transmission 6 is being executed, thereby preventing the driver from feeling a sense of discomfort. Further, in the inertial phase (from time point t21 to time point t23 ), execution of the torque control for the first shift increases the second drive torque $T_{OUT2}$ from the second drive unit 10b by the time shifting is completed (at time point t24 ). Accordingly, the second drive torque $T_{OUT2}$ is output in accordance with the driver request output, and thus it is possible to prevent the driver from feeling a sense of discomfort.

Whereas the torque control for the second shift changes the engine rotational speed $N_E$, when, for example, it is not possible to further decrease the engine rotational speed $N_E$ as it is almost the same as an idling rotational speed, it is preferable that the torque control for the third shift be executed.

Note that, as described, the torque control for the third shift is executed only in the torque phase. However, the invention is not limited to operating in this way. The torque control for the third shift may be executed also in the inertial phase, that is, the torque control for the third shift may be executed at any time when shifting is being executed.

Note that, an explanation is given for the case where the torque control for the first shift and the torque control for the third shift are executed while up-shifting. Needless to say, it is also possible to execute the torque control for the first shift and the torque control for the third shift while down-shifting. Even while down-shifting, execution of the torque control for the first shift in the inertial phase and execution of the torque control for the third shift during shifting enables the total drive torque $T_{OUT1}+T_{OUT2}$ of the vehicle to be made approximately equal to the driver request output even when shifting of the stepped transmission 6 is being executed. Therefore, it is possible to prevent the driver from feeling a sense of discomfort.

Figure 11:
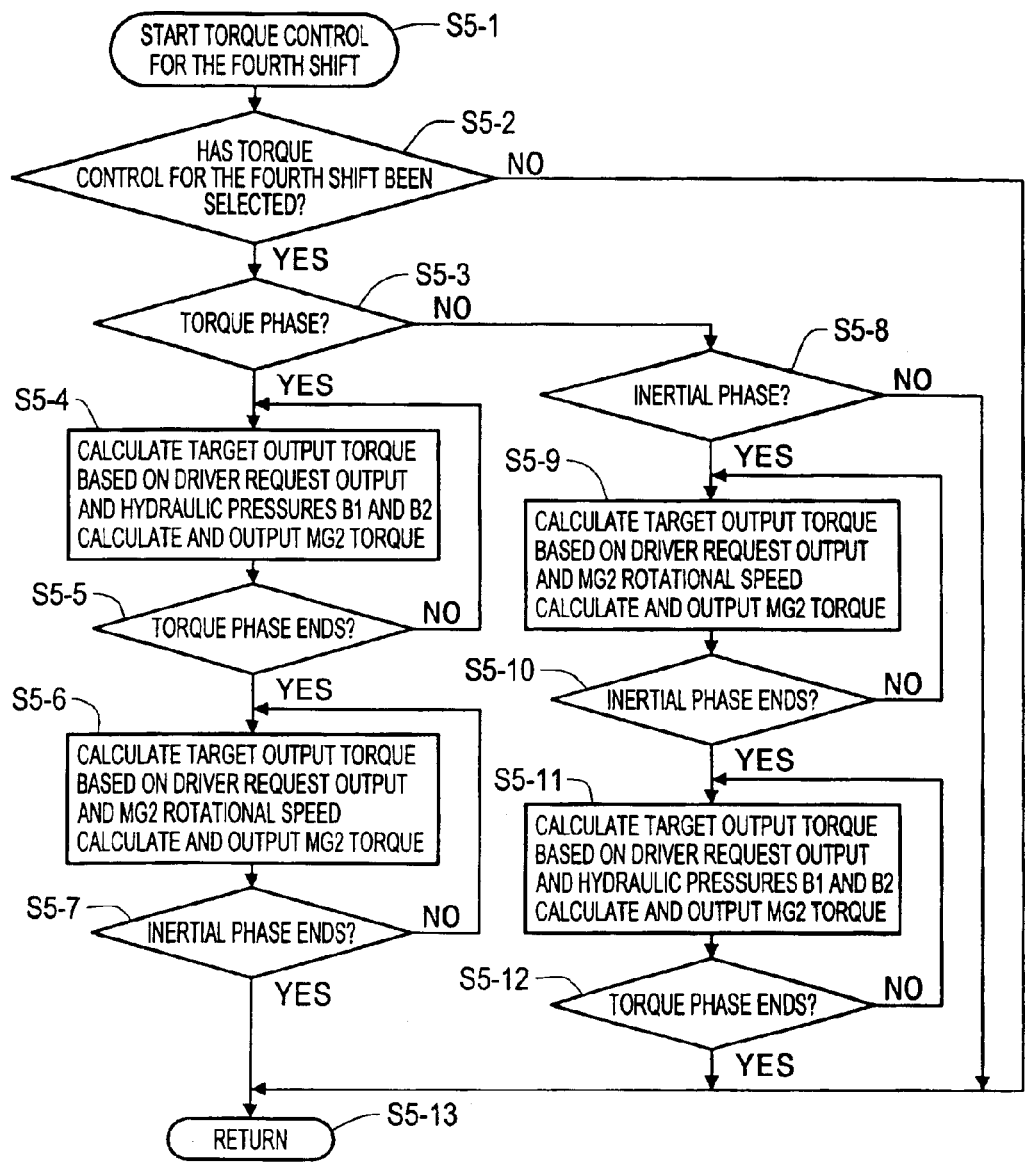
FIG. 11 is a flow chart showing a torque control for a fourth shift.
Figure 12:
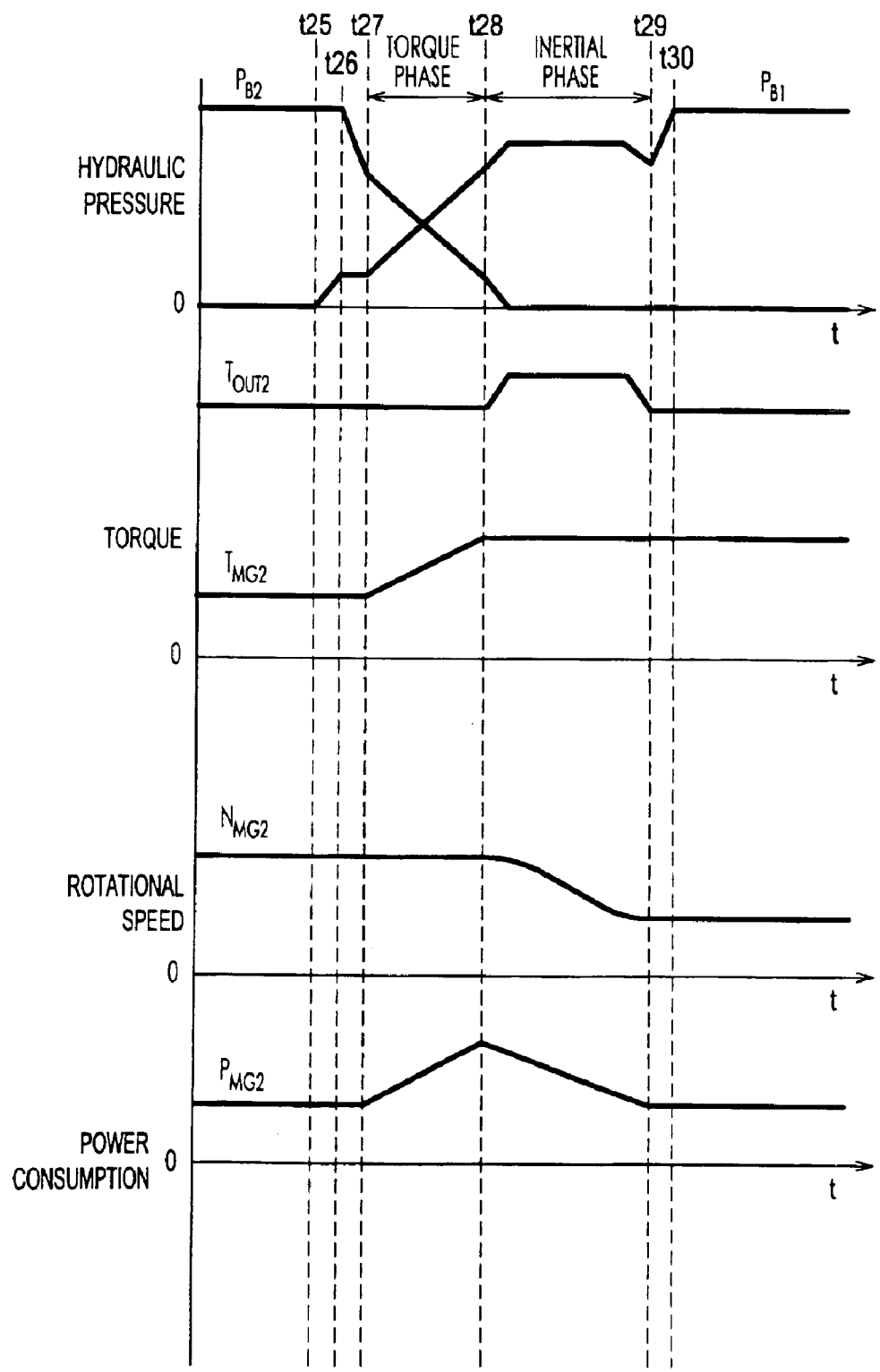
FIG. 12 is a time chart showing a case where the torque control for the fourth shift is executed while up-shifting.
Figure 13:
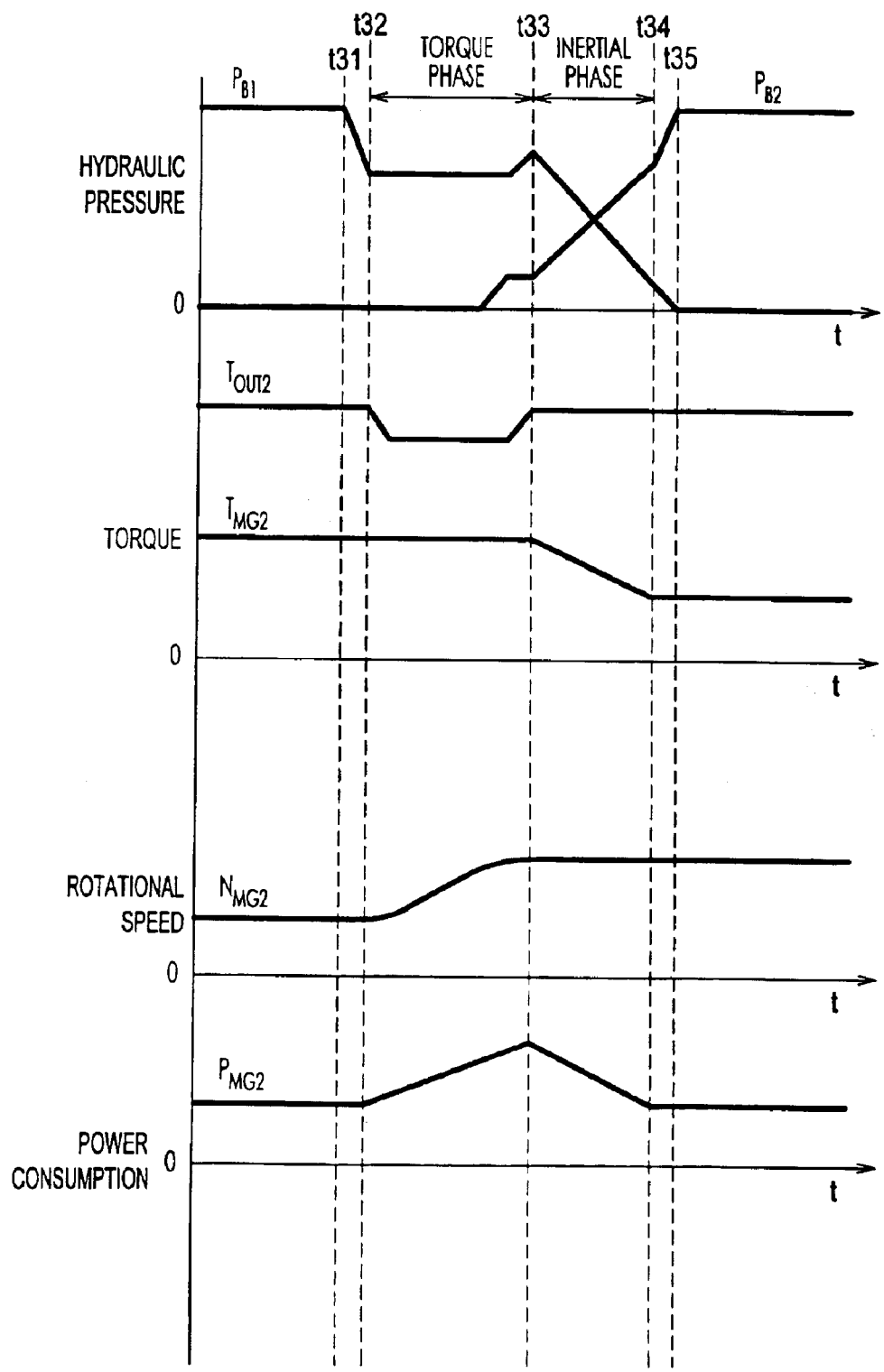
FIG. 13 is a time chart showing a case where the torque control for the fourth shift is executed while down-shifting.

Next, the torque control for the fourth shift will be explained with reference to FIGS. 11 to 13. FIG. 11 is a flow chart showing the torque control for the fourth shift, FIG. 12 is a time chart showing a case where the torque control for the fourth shift is executed while up-shifting, and FIG. 13 is a time chart showing a case where the torque control for the fourth shift is executed while down-shifting.

For example, when the aforementioned torque distribution setting means 46 selects the torque control for the fourth shift and sets the torque output distribution (S1-11), the during-shift drive control means 45 executes the torque control for each shift (S1-12). After the torque control for the fourth shift is started (S5-1), as shown in FIG. 11, it is determined whether the torque distribution setting means 46 has selected the torque control for the fourth shift (Yes at S5-2). Note that, when the torque control for the fourth shift is not selected, the routine proceeds to step S5-13 and returns. The procedure is repeated without executing any control until the torque control for the fourth shift is selected.

Further, at step S5-2, when it is determined that the torque control for the fourth shift is selected, the routine proceeds to step S5-3. At S5-3, it is determined whether the current phase is the torque phase based on the detection by the torque phase detection means 47. When the current phase is not the torque phase (No at S5-3), the routine proceeds to step S5-8. At step S5-8, it is determined whether the current phase is the inertial phase. When the current phase is not the inertial phase (No at S5-8), the routine proceeds to step S5-13 and returns. The procedure is repeated until the torque phase or the inertial phase is detected.

In the aforementioned step S5-3, when it is determined that the current phase is the torque phase (Yes at S5-3), the routine proceeds to step S5-4. First, the during-shift drive control means 45 calculates the target output torque from the second drive unit 10b based on the driver request output detected by the driver request output detection means 43 and the hydraulic pressures of the hydraulic servos of the first brake B1 and the second brake B2 which are set by the shift control means 37 (In this case, when the plurality of torque controls for shift are selected in step S1-11, in place of the driver request output, the target output torque may be calculated based on the set torque output distribution. Further, alternatively, the hydraulic pressures of the hydraulic servos of the first brake B1 and the second brake B2 may be detected by the hydraulic pressure detection means 38.). The target output torque accords with the change (decrease) in the torque from the second drive unit 10b which is generated by the switch-over between the first brake B1 and the second brake B2 of the stepped transmission 6. Also, the target output torque accords with the transmission torque of the stepped transmission 6 which changes due to up-shifting (i.e., change in the gear ratio) (that is, the target output torque accords with the torque required for the second drive unit 10b required for outputting the driver request output after shifting is completed). In other words, the during-shift drive control means 45 calculates the target output torque which inhibits changes of the total drive torque $T_{OUT1}+T_{OUT2}$ of the vehicle.

Next, the during-shift drive control means 45 calculates the MG2 torque $T_{MG2}$ of the second motor 4 required for outputting the calculated target output torque from the second drive unit 10b (Specifically, the during-shift drive control means 45 calculates the MG2 torque $T_{MG2}$ such that the MG2 torque $T_{MG2}$ gradually increases while the driver request output is substantially constant, in accordance with the decrease in the transmission torque of the stepped transmission 6 which is generated in the torque phase and the change in the gear ratio.). Next, the during-shift drive control means 45 commands the second motor control means 33 to output the calculated MG2 torque $T_{MG2}$. That is, the calculated MG2 torque $T_{MG2}$ is output from the second motor 4 (S5-4). Subsequently, the during-shift drive control means 45 executes the aforementioned control in the torque phase (at S5-4 and S5-5). When the torque phase ends, the routine proceeds to step S5-6.

If the torque phase is detected in the aforementioned step S5-3 (Yes at S5-3), the executed shifting is the up-shifting in which the torque phase comes earlier. In this case, when the torque phase ends, the phase turns to the inertial phase. Thus, when the routine proceeds to step S5-6, the during-shift drive control means 45 starts the control in the inertial phase. Specifically, at first, the during-shift drive control means 45 calculates the target output torque which is output from the second drive unit 10b in the inertial phase, based on the driver request output detected by the aforementioned driver request output detection means 43 and the rotational speed $N_{MG2}$ of the second motor 4 detected by the motor rotational speed detection means 36 (in this case, in place of the driver request output, the target output torque may be calculated based on the set torque output distribution, when the plurality of torque controls for shift are selected in step S1-11). That is, the driver request output detection means 43 calculates the target output torque which inhibits changes of the total drive torque $T_{OUT1}+T_{OUT2}$ of the vehicle.

Next, the during-shift drive control means 45 calculates the MG2 torque $T_{MG2}$ of the second motor 4 in order to output the calculated target output torque from the second drive unit 10b (Specifically, the torque from the second drive unit 10b does not change due to shifting of the stepped transmission 6 in the inertial phase. Therefore, the during-shift drive control means 45 calculates the MG2 torque $T_{MG2}$ such that it is maintained in accordance with the driver request output). Next, the during-shift drive control means 45 commands the second motor control means 33 to output the calculated MG2 torque $T_{MG2}$. In other words, the calculated MG2 torque $T_{MG2}$ is output from the second motor 4 (S5-6). Subsequently, the during-shift drive control means 45 executes the aforementioned control repeatedly in the inertial phase (at S5-6 and S5-7). When the inertial phase ends, the routine proceeds to step S5-13, and returns. Note that when the driver request output is changed while the controls in the aforementioned steps S5-4 to step S5-7 are repeatedly executed (see S1-10 to S1-13), the during-shift drive control means 45 reflects the setting of the torque output distribution from the torque distribution setting means 46 and executes each calculation of step S5-4 and S5-6.

Meanwhile, when it is detected that the current phase is not the torque phase at step S5-3 (No at S5-3) and it is detected that the current phase is the inertial phase (Yes at S5-8), the routine proceeds to step S5-9. As is the case with step S5-6, the during-shift drive control means 45 calculates the target output torque which is output from the second drive unit 10b in the inertial phase based on the driver request output which is detected by the driver request output detection means 43 and the rotational speed $N_{MG2}$ of the second motor 4 detected by the motor rotational speed detection means 36 (in this case, in place of the driver request output, the target output torque may be calculated based on the set torque output distribution, when the plurality of torque controls for shift are selected in step S1-11). That is, the during-shift drive control means 45 calculates the target output torque which inhibits changes of the total drive torque $T_{OUT1}+T_{OUT2}$ of the vehicle.

Next, the during-shift drive control means 45 calculates the MG2 torque $T_{MG2}$ of the second motor 4 in order to output the calculated target output torque from the second drive unit 10b (Specifically, the torque from the second drive unit 10b does not change due to shifting of the stepped transmission 6 in the inertial phase. Therefore, the during-shift drive control means 45 calculates the MG2 torque $T_{MG2}$ such that it is maintained in accordance with the driver request output.). Next, the during-shift drive control means 45 commands the second motor control means 33 so as to output the calculated MG2 torque $T_{MG2}$. In other words, the calculated MG2 torque $T_{MG2}$ is output from the second motor 4 (S5-9). Subsequently, the during-shift drive control means 45 executes the aforementioned control repeatedly in the inertial phase (S5-9 and S5-10), and the routine proceeds to step S5-11 when the torque phase ends.

When the torque phase is detected in the aforementioned step S5-8 (Yes at S5-8), the executed shifting is the down-shifting in which the torque phase comes earlier. In this case, when the torque phase ends, the phase turns to the inertial phase. Thus, when the routine proceeds to step S5-11, the during-shift drive control means 45 starts the control in the torque phase. As is the case with the aforementioned step S5-4, the during-shift drive control means 45 calculates the target output torque from the second drive unit 10b based on the driver request output detected by the driver request output detection means 43 and the hydraulic pressures of the hydraulic servos of the first brake B1 and the second brake B2 which is set by the shift control means 37 (In this case, when the plurality of torque controls for shift are selected in step S1-11, in place of the driver request output, the target output torque may be calculated based on the set torque output distribution. Further, alternatively, the hydraulic pressures of the hydraulic servos of the first brake B1 and the second brake B2 may be detected by the hydraulic pressure detection means 38.). The target output torque from the second drive unit 10b accords with the change (decrease) in the torque from the second drive unit 10b which is generated by the switch-over between the first brake B1 and the second brake B2 of the stepped transmission 6, and accords with the transmission torque of the stepped transmission 6 which changes because of down-shifting (i.e., change in the gear ratio) (that is, the target output torque from the second drive unit 10b accords with the torque required for outputting the driver request output from the second drive unit 10b after shifting is completed). In other words, the during-shift drive control means 45 calculates the target output torque which inhibits changes of the total drive torque $T_{OUT1}+T_{OUT2}$ of the vehicle.

Subsequently, the during-shift drive control means 45 calculates the MG2 torque $T_{MG2}$ of the second motor 4 required for outputting the calculated target output torque from the second drive unit 10b (Specifically, the during-shift drive control means 45 calculates the MG2 torque $T_{MG2}$ such that the MG2 torque $T_{MG2}$ gradually increases while the driver request output is substantially constant, in accordance with the decrease in the transmission torque of the stepped transmission 6 which is generated in the torque phase and the change in the gear ratio.). Further, the during-shift drive control means 45 commands the second motor control means 33 to output the calculated MG2 torque $T_{MG2}$. That is, the calculated MG2 torque $T_{MG2}$ is output from the second motor 4 (S5-11). Subsequently, the during-shift drive control means 45 executes the aforementioned control repeatedly in the torque phase (S5-11 and S5-12). When the torque phase ends, the routine proceeds to step S5-13 and returns. Note that, when the driver request output is changed while the aforementioned steps S5-8 to S5-12 are repeatedly controlled (see S1-10 to S1-13), the during-shift drive control means 45 reflects the setting of the torque output distribution from the torque distribution setting means 46 and executes each calculation of step S5-9 and step S5-11.

Next, an example where the torque control for the fourth shift is executed while up-shifting will be explained with reference to FIG. 12. In the time chart shown in FIG. 12, it is also assumed that accelerator opening and the driver request output are constant, and that the vehicle speed is substantially constant. As shown in FIG. 12, the hydraulic pressure $P_{B2}$ is supplied to the hydraulic servo of the second brake B2, which causes the second brake B2 to engage, and the stepped transmission 6 is in the low-speed stage (Lo) as described above. Further, in this low-speed stage (Lo), the rotational speed $N_{MG2}$ of the second motor 4 accords with the gear ratio of the stepped transmission 6 and the vehicle speed, and the MG2 torque $T_{MG2}$ is output in accordance with the aforementioned driver request output.

For example, at time point t25, when the shift control means 37 determines the need to start up-shifting based on the shifting map (not shown) or the like, the torque distribution setting means 46 selects the torque control for each shift and sets the torque output distribution as described above (from S1-2 to S1-13). In response to this, the during-shift drive control means 45 starts the torque control for the fourth shift (S5-1). At time point t25, the shift control means 37 controls the solenoid valve (not shown) of the hydraulic pressure control unit 7 so as to start increasing the hydraulic pressure $P_{B1}$ of the hydraulic servo of the first brake B1. Accordingly, the friction plate (not shown) of the first brake B1 moves closer to the piston of the hydraulic servo, namely, so called play elimination is executed. Further, at time point t26, the shift control means 37 controls the hydraulic pressure control unit 7 so as to start decreasing the hydraulic pressure $P_{B2}$ of the hydraulic servo of the second brake B2, thereby easing pressurization of the friction plate by the piston of the hydraulic servo of the second brake B2.

Next, at time point t27, the shift control means 37 gradually decreases the hydraulic pressure $P_{B2}$ of the hydraulic servo of the second brake B2, and gradually increases the hydraulic pressure $P_{B1}$ of the hydraulic servo of the first brake B1. Accordingly, the transmission torque of the second brake B2 decreases, and the friction plate of the first brake B1 starts to slip, whereby the transmission torque of the first brake B1 increases. Therefore, the transmission torque of the first brake B1 and the transmission torque of the second brake B2 replace each other. That is, the current phase becomes the torque phase. In the torque phase, the transmission torque of the stepped transmission 6 is reduced. Thus, when the MG2 torque $T_{MG2}$ of the second motor 4 is substantially constant, the second drive torque $T_{OUT2}$ which is output from the second drive unit 10b decreases (see FIG. 5).

At time point t27, when the during-shift drive control means 45 detects that the current phase is the torque phase (Yes at S5-3), the driver request output and the hydraulic pressures of the hydraulic servos of the first brake B1 and the second brake B2 are detected. Then, the during-shift drive control means 45 calculates the target output torque of the second drive unit 10b based on the driver request output and the hydraulic pressures of the hydraulic servos of the first brake B1 and the second brake B2. The target output torque of the second drive unit 10b accords with the decrease in the transmission torque of the stepped transmission 6 which is generated by the switch-over between the first brake B1 and the second brake B2, and in accordance with the transmission torque of the stepped transmission 6 after up-shifting. Further, the during-shift drive control means 45 calculates the MG2 torque $T_{MG2}$ based on the calculated target output torque, and the MG2 torque $T_{MG2}$ is output from the second motor 4 (S5-4).

Therefore, the MG2 torque $T_{MG2}$ which is output from the second motor 4 increases, whereby the second drive torque $T_{OUT2}$ from the second drive unit 10b is maintained at a substantially constant value, in accordance with the driver request output as shown in FIG. 12. Namely, the total drive torque $T_{OUT1}+T_{OUT2}$ of the vehicle accords with the driver request output (that is, it is substantially constant). Note that, the power consumption $P_{MG2}$ of the second motor 4 increases from time point t27 to time point t28, because the MG2 torque $T_{MG2}$ increases while the rotational speed $N_{MG2}$ of the second motor 4 is substantially constant.

At time point t28, when the ratio of the torque distributed to the first brake B1 and the torque distributed to the second brake B2 is reversed and the transmission torque of the second brake B2 decreases to substantially zero, the torque is transmitted by the first brake B1. Then, the shift control means 37 further increases the hydraulic pressure $P_{B1}$ of the hydraulic servo of the first brake B1. Accordingly, the first brake B1 gradually moves from the slipping state until it is engaged. The gear ratio of the stepped transmission 6 changes from the low-speed stage (Lo) to the high-speed stage (Hi). In accordance with this change, the rotational speed $N_{GM2}$ of the second motor 4 decreases, while the current phase becomes the inertial phase. Further, the inertial phase detection means 48 detects that the current phase is the inertial phase based on the vehicle speed and the change in the rotational speed $N_{MG2}$ of the second motor 4. After time point t28, the hydraulic pressure $P_{B2}$ of the hydraulic servo of the second brake B2 is bled, and the hydraulic pressure $P_{B2}$ decreases to substantially zero by time point t22.

When the inertial phase detection means 48 detects that the current phase is the inertial phase (Yes at S5-5), the driver request output and the rotational speed $N_{MG2}$ of the second motor 4 are detected. Then, the during-shift drive control means 45 calculates the target output torque which is output from the second drive unit 10b in the inertial phase, based on the driver request output and the rotational speed $N_{MG2}$ of the second motor 4. That is, the target output torque necessary to inhibit the total torque $T_{OUT1}+T_{OUT2}$ of the vehicle from changing is calculated. Next, the during-shift drive control means 45 calculates the MG2 torque $T_{MG2}$ based on the calculated target output torque, and the second motor control means 33 executes the control such that the second motor 4 outputs the MG2 torque $T_{MG2}$ (S5-7). In this inertial phase, because there is no change in the torque from the second drive unit 10b caused by shifting of the stepped transmission 6, the MG2 torque $T_{MG2}$ is output such that it is maintained in accordance with the driver request output.

Further, when the aforementioned control is executed repeatedly from time point t28 to time point t29, the rotational speed $N_{MG2}$ of the second motor 4 decreases while the MG2 torque $T_{MG2}$ is maintained. Accordingly, the second drive torque $T_{OUT2}$ from the second drive unit 10b accords with the driver request output, until the first brake B1 becomes substantially fully engaged at time point t29. Note that because the rotational speed $N_{MG2}$ of the second motor 4 changes with respect to the rotational speed of the transmission shaft 21 (that is, the drive wheels 16) in the inertial phase, the inertial force generated in the stepped transmission 6 accords with the change of the rotational speed (from time point t28 to time point t29), and the inertial torque is output from the second drive unit 10b. Therefore, as shown in FIG. 12, the second drive torque $T_{OUT2}$ of the second drive unit 10b decreases as the rotational speed $N_{MG2}$ converges to the high speed stage (low rotational speed), after increasing due to the inertial torque thereof. Subsequently, the shift control means 37 increases the hydraulic pressure $P_{B1}$ of the hydraulic servo of the first brake B1 to the hydraulic pressure required for full engagement from time point t29 to time point t30, and the shift control is completed at time point t20 (S1-13).

From time point t28 to time point t29, because the rotational speed $N_{MG2}$ of the second motor 4 decreases, the driver request output is constant and the MG2 torque $T_{MG2}$ is maintained at a substantially constant value, the power consumption $P_{MG2}$ of the second motor 4 decreases. Further, the power consumption $P_{MG2}$ of the second motor 4 after shifting equals that before shifting (i.e., before time point t25), because (i) the driver request output is substantially constant, and (ii) the second drive torque $T_{OUT2}$ that is output from the second drive unit 10b before shifting is the same as that when shifting is completed (that is, because the product of the rotational speed $N_{MG2}$ and the MG2 torque $T_{MG2}$ is constant, as in the case of the torque control for the first shift).

As described above, in the torque phase (from time point t27 to time point t28), execution of the torque control for the fourth shift on the MG2 torque $T_{MG2}$ of the second motor 4 increases the second drive torque $T_{OUT2}$ from the second drive unit 10b, while the transmission torque of the stepped transmission 6 is reduced. Therefore, it is possible to make the total drive torque $T_{OUT1}+T_{OUT2}$ of the vehicle approximately equal to the driver request output, even in the torque phase during shift. Accordingly, it is possible to prevent the driver from feeling a sense of discomfort. Also in the inertial phase (from time point t28 to time point t29), the second drive torque $T_{OUT2}$ from the second drive unit 10b is maintained until shifting is completed due to execution of the torque control for the fourth shift. Therefore, the control system is capable of outputting the second drive torque $T_{OUT2}$ in accordance with the driver request output, thereby preventing the driver from feeling a sense of discomfort.

Next, an example where the torque control for the fourth shift is executed while down-shifting will be explained with reference to FIG. 13. Again, the time chart shown in FIG. 13, it is assumed that the accelerator opening and the driver request output are constant, and that the vehicle speed is substantially constant. As shown in FIG. 13, the hydraulic pressure $P_{B1}$ is supplied to the hydraulic servo of the first brake B1, in other words, the first brake B1 is engaged. The stepped transmission 6 is in the high-speed stage (Hi) as described above. Further, in this high-speed stage (Hi), the rotational speed $N_{MG2}$ of the second motor 4 accords with the gear ratio of the stepped transmission 6 and the vehicle speed, and the MG2 torque $T_{MG2}$ is output in accordance with the driver request output.

For example, at time point t31, when the shift control means 37 determines the need to start up-shifting based on the shifting map (not shown) or the like, the torque distribution setting means 46 selects the torque control for each shift and sets torque output distribution (S1-2 to S1-13). In response to this, the during-shift drive control means 45 starts the torque control for the fourth shift (S5-1). At time point t31, the shift control means 37 controls the hydraulic pressure control unit 7 (more specifically, the linear solenoid valve (not shown) thereof) so as to start decreasing the hydraulic pressure $P_{B1}$ of the hydraulic servo of the first brake B1 and easing pressurization of the friction plate by the piston of the hydraulic servo of the first brake B1.

Next, at time point t32, the friction plate of the first brake B1 starts to slip. Then, the slipping state of the first brake B1 is gradually intensified until it is released. Also, the gear ratio of the stepped transmission 6 changes from the high-speed stage (Hi) to the low-speed stage (Lo). In accordance with this change, the rotational speed $N_{MG2}$ of the second motor 4 increases, while the current phase becomes the inertial phase. Next, the inertial phase detection means 48 detects that the current phase is the inertial phase based on the vehicle speed and the change in the rotational speed $N_{MG2}$ of the second motor 4.

When the inertial phase detection means 48 detects that the current phase is the inertial phase (Yes at S5-8), the driver request output detection means 43, which is included within the during-shift drive control portion 45, detects the driver request output (which is assumed to be constant here), and the motor rotational speed detection means 36, which is also included within the during-shift drive control portion 45, detects the rotational speed $N_{MG2}$ of the second motor 4. The during-shift drive control means 45 calculates the target output torque which is output from the second drive unit 10b in the inertial phase, based on the driver request output and the rotational speed $N_{MG2}$. Namely, the target output torque necessary to inhibit changes of the total drive torque $T_{OUT1}+T_{OUT2}$ of the vehicle is calculated. Next, the during-shift drive control means 45 calculates the MG2 torque $T_{MG2}$ based on the calculated target output torque, and the second motor control means 33, which is also included within the during-shift drive control portion 45, executes control such that the second motor 4 outputs the MG2 torque $T_{MG2}$ (S5-9). In the inertial phase, there is no change in the torque from the second drive unit 10b because the stepped transmission 6 shifts. Therefore, the MG2 torque $T_{MG2}$ is output such that it is maintained in accordance with the driver request output.

When the aforementioned control is repeatedly executed from time point t32 to time point t33, the rotational speed $N_{MG2}$ of the second motor 4 increases and the MG2 torque $T_{MG2}$ is maintained. Accordingly, the second drive torque $T_{OUT2}$ from the second drive unit 10b accords with the driver request output. Note that, in the inertial phase, the rotational speed $N_{MG2}$ of the second motor 4 changes with respect to the rotational speed of the transmission shaft 21 (that is, the drive wheels 16). Therefore, the inertial force generated in the stepped transmission 6 accords with the change of the rotational speed thereof (from time point t32 to time point t33), and the inertial torque is output from the second drive unit 10b. Accordingly, as shown in FIG. 13, the second drive torque $T_{OUT2}$ output from the second drive unit 10b increases as the rotational speed $N_{MG2}$ converges to the low-speed stage, after decreasing due to the inertial torque thereof.

From time point t32 to time point t33, the rotational speed $N_{MG2}$ of the second motor 4 increases, while the driver request output is constant and the MG2 torque $T_{MG2}$ is maintained at a substantially constant value. Therefore, the power consumption $P_{MG2}$ of the second motor 4 increases.

Prior to the end of the inertial phase (that is, before time point t33), the shift control means 37 controls the hydraulic pressure control unit 7 (more specifically, the linear solenoid valve (not shown) thereof) so as to increase the hydraulic pressure $P_{B2}$ of the hydraulic servo of the second brake B2. Accordingly the friction plate (not shown) of the second brake B2 moves closer to the piston of the hydraulic servo. Namely, so called play elimination is executed.

Next, at time point t33, the shift control means 37 continues decreasing the hydraulic pressure $P_{B1}$ of the hydraulic servo of the first brake B1, and increases the hydraulic pressure $P_{B2}$ of the hydraulic servo of the second brake B2. Accordingly, the transmission torque of the first brake B1 decreases and the transmission torque of the second brake B2 increases. Accordingly, the transmission torque of the first brake B1 and the transmission torque of the second brake B2 replace each other. That is, the current phase becomes the torque phase. In this torque phase, the second brake B2 is gradually engaged, and the transmission torque of the stepped transmission 6 increases. Accordingly, when the MG2 torque $T_{MG2}$ of the second motor 4 is substantially constant, the second drive torque $T_{OUT2}$ output from the second drive unit 10b increases (see FIG. 6).

At time point t33, when it is detected that the current phase is the torque phase (Yes at S5-10), the driver request output and the hydraulic pressures of the hydraulic servos of the first brake B1 and the second brake B2 are detected. Then, the during-shift drive control means 45 calculates the target output torque from the second drive unit 10b based on the driver request output, and the hydraulic pressures of the hydraulic servos of the first brake B1 and the second brake B2. The during-shift drive control means 45 calculates the target output torque such that it accords with (i) the increase in the transmission torque of the stepped transmission 6 generated by the switch-over between the first brake B1 and the second brake B2, and (ii) the transmission torque of the stepped transmission 6 after down-shifting. Then, the during-shift drive control means 45 calculates the MG2 torque $T_{MG2}$ based on the calculated target output torque, whereby the MG2 torque $T_{MG2}$ is output from the second motor 4 (S5-11).

Accordingly, the MG2 torque $T_{MG2}$ which is output from the second motor 4 decreases. Accordingly, the second drive torque $T_{OUT2}$ from the second drive unit 10b is maintained at a substantially constant value, in accordance with the driver request output as shown in FIG. 13. That is, the total drive torque $T_{OUT1}+T_{OUT2}$ of the vehicle accords with the driver request output (that is, the total drive torque $T_{OUT1}+T_{OUT2}$ is substantially constant).

The power consumption $P_{MG2}$ decreases from time point t33 to time point t34, because the MG2 torque $T_{MG2}$ decreases while the rotational speed $N_{MG2}$ of the second motor 4 is substantially constant. Further, the power consumption $P_{MG2}$ when shifting is completed is the same as that before shifting (i.e., before time point t25), because the driver request output is substantially constant and the second drive torque $T_{OUT2}$ that is output from the second drive unit 10b before shifting is the same as that when shifting is completed (that is, because the product of the rotational speed $N_{MG2}$ and the MG2 torque $T_{MG2}$ is constant, as in the case of the torque control for the first shift).

Further, at time point t34, when the ratio of the torque distributed to the first brake B1 and the torque distributed to the second brake B2 is reversed and the transmission torque of the first brake B1 decreases to substantially zero, the torque is transmitted by the second brake B2. Then, the shift control means 37 further increases the hydraulic pressure $P_{B2}$ of the hydraulic servo of the second brake B2, and the hydraulic pressure $P_{B1}$ of the hydraulic servo of the first brake B1 is bled. Accordingly, the shift control is completed at time point t35 (S1-13).

As described above, because execution of the torque control for the fourth shift enables the second drive torque $T_{OUT2}$ from the second drive unit 10b to be maintained until the start of the torque phase (at time point t33), the control system is capable of outputting the second drive torque $T_{OUT2}$ in accordance with the driver request output in the inertial phase (from time point t32 to time point t33). Accordingly, it is possible to prevent the driver from feeling a sense of discomfort. Also, in the torque phase (from time point t33 to time point t34), the MG2 torque $T_{MG2}$ of the second motor 4 is controlled by the torque control for the fourth shift, while the transmission torque of the stepped transmission 6 increases, enabling the second drive torque $T_{OUT2}$ from the second drive unit 10b to decrease. Therefore, it is possible make the total drive torque $T_{OUT1}+T_{OUT2}$ of the vehicle approximately equal to the driver request output, thereby preventing the driver from feeling a sense of discomfort.

Figure 14:
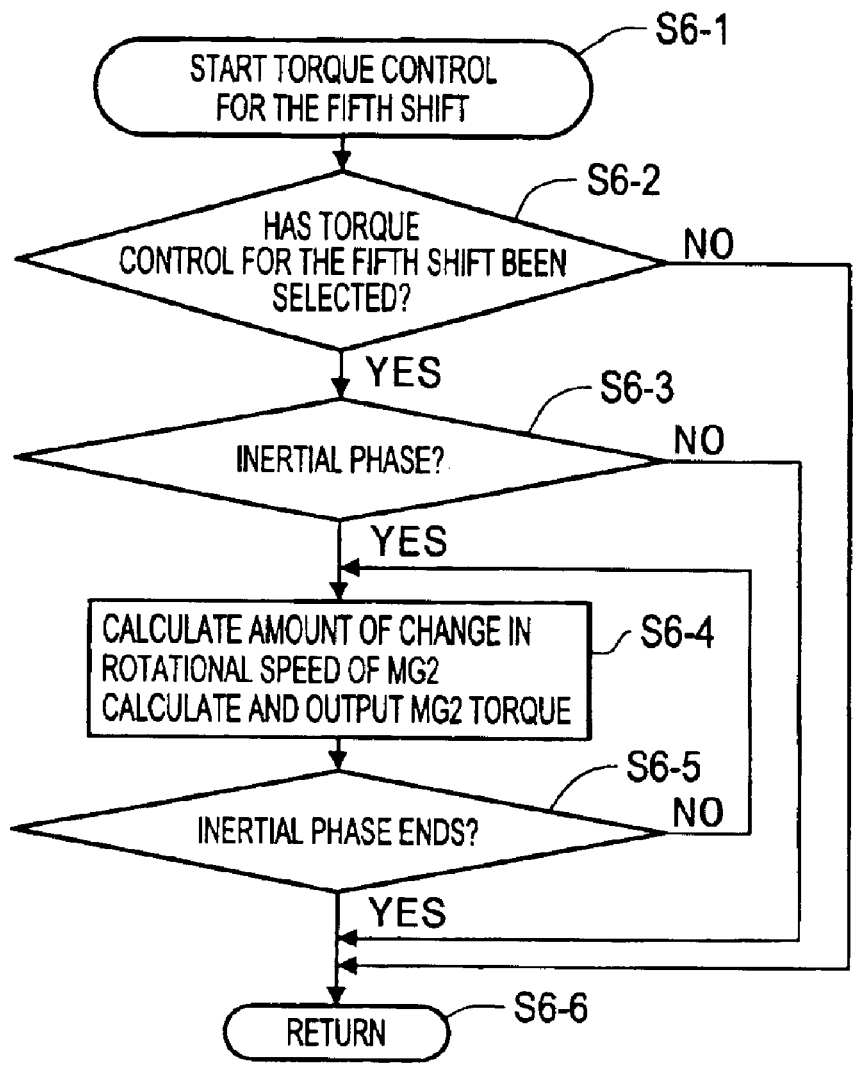
FIG. 14 is a flow chart showing a torque control for a fifth shift.
Figure 15:
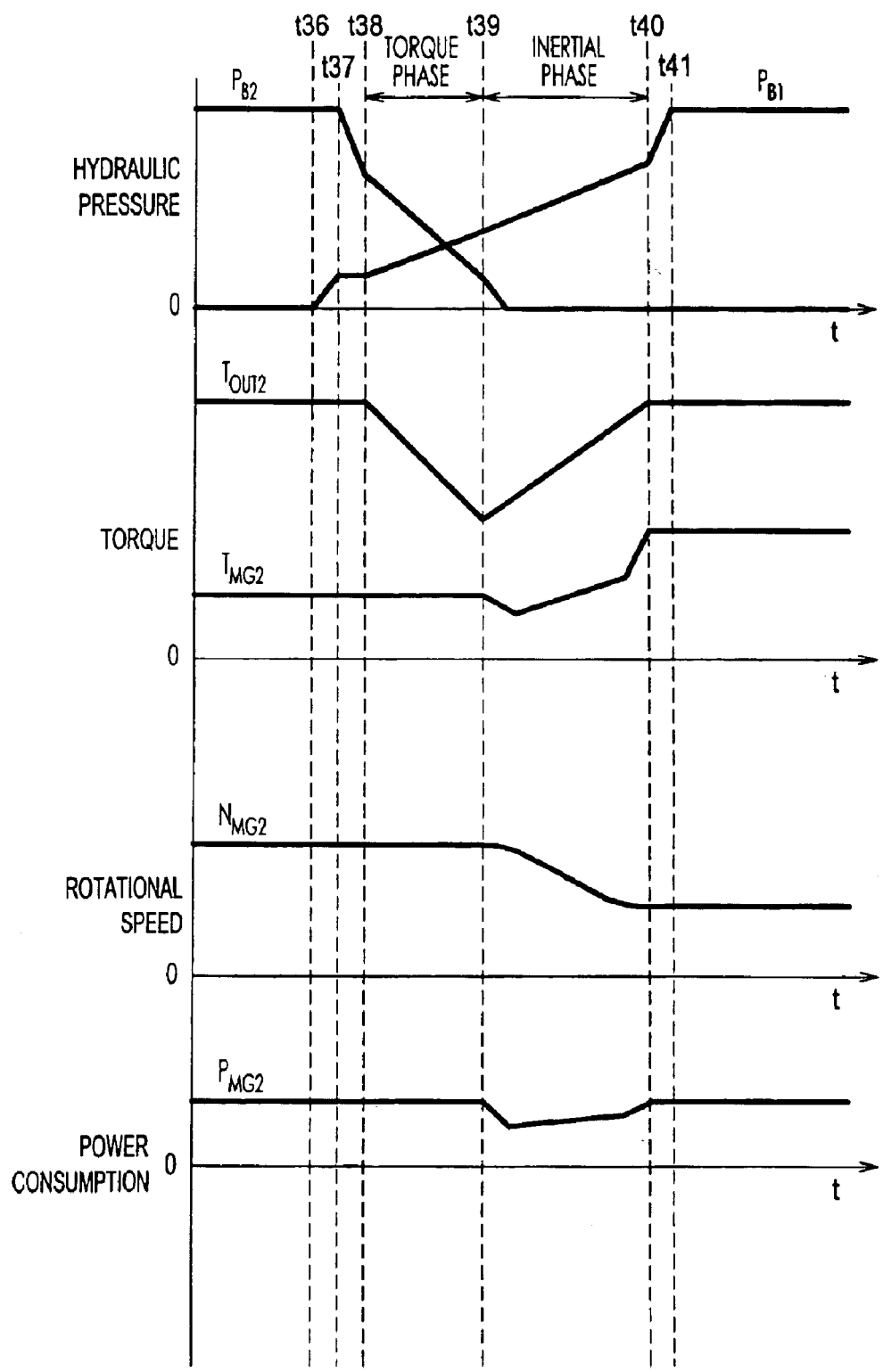
FIG. 15 is a time chart showing a case where the torque control for the first shift and the torque control for the fifth shift are executed while up-shifting.
Figure 16:
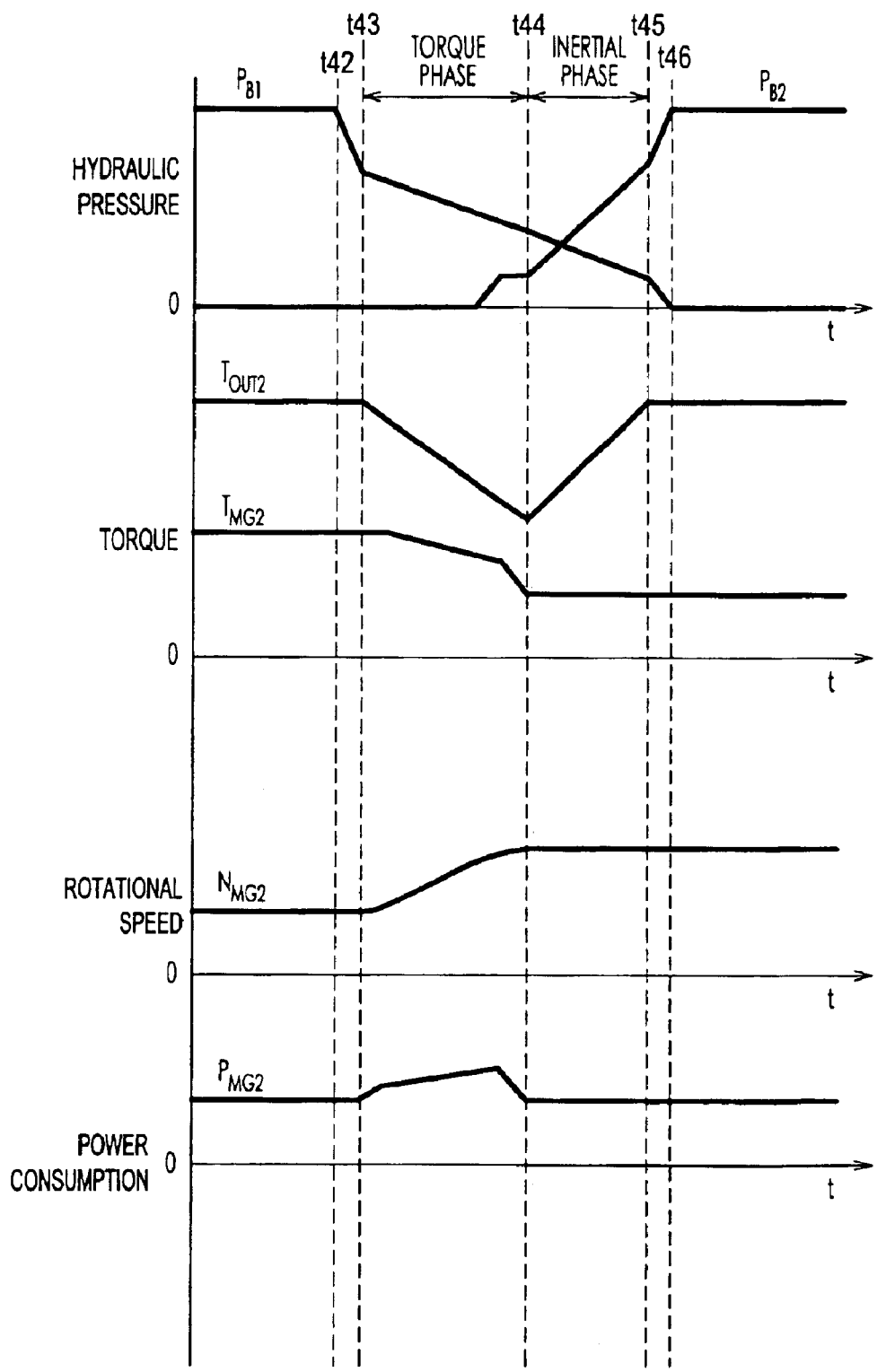
FIG. 16 is a time chart showing a case where the torque control for the first shift and the torque control for the fifth shift are executed while down-shifting.

Next, the torque control for the fifth shift as described above will be explained with reference to FIGS. 14 to 16. FIG. 14 is a flow chart showing the torque control for the fifth shift, FIG. 15 is a time chart showing a case where the torque control for the first shift and the torque control for the fifth shift are executed while up-shifting, and FIG. 16 is a time chart showing a case where the torque control for the first shift and the torque control for the fifth shift are executed while down-shifting.

For example, when the torque distribution setting means 46 selects the torque control for the fifth shift and sets the torque output distribution (S1-11), the during-shift drive control means 45 executes the torque control for each shift (S1-12). After the torque control for the fifth shift is started (S6-1) as shown in FIG. 14, it is determined whether the torque control for the fifth shift has been selected by the torque distribution setting means 46 (Yes at S6-2). Note that when the torque control for the fifth shift is not selected, the routine proceeds to step S6-7 and returns, and the procedure is repeated without executing any control until the torque control for the fifth shift is selected.

Further, when it is determined the torque control for the fifth shift has been selected, the routine proceeds to step S6-3. At step S6-3, it is determined whether the current phase is the inertial phase based on the detection by the inertial phase detection means 48. When the current phase is not the inertial phase (No at S5-3), the routine proceeds to step S5-7 and returns in a similar manner as noted above.

When it is determined that the current phase is the inertial phase (Yes at S6-3), the routine proceeds to step S6-4. First, the motor rotational speed detection means 36, which is included within the during-shift drive control portion 45, detects the rotational speed $N_{MG2}$ of the second motor 4, and the during-shift drive control means 45 calculates the rotational speed of the second motor 4 based on the rotational speed $N_{MG2}$ of the second motor 4. Further, the during-shift drive control means 45 calculates the inertial torque which is generated in the second drive unit 10b based on the calculated change of the rotational speed of the second motor 4, and calculates the MG2 torque $T_{MG2}$ for offsetting the inertial torque. Next, the during-shift drive control means 45 commands the second motor control means 33 to output the calculated MG2 torque $T_{MG2}$. That is, the calculated MG2 torque $T_{MG2}$ is output from the second motor 4 (S6-4).

Subsequently, the during-shift drive control means 45 executes the aforementioned control repeatedly in the inertial phase (S6-4 and S6-5). When the inertial phase ends, the routine proceeds to step S6-6 and returns.

Next, an example where the torque control for the first shift and the torque control for the fifth shift are executed while up-shifting will be explained with reference to FIG. 15. Note that in the time chart shown in FIG. 15, it is assumed that the accelerator opening and the driver request output are constant, and that the vehicle speed is substantially constant. As shown in FIG. 15, the hydraulic pressure $P_{B2}$ is supplied to the hydraulic servo of the second brake B2, which causes the second brake B2 to engage. As described above, the stepped transmission 6 is in the low-speed stage (Lo). In this low-speed stage (Lo), the rotational speed $N_{MG2}$ of the second motor 4 accords with the gear ratio of the stepped transmission 6 and the vehicle speed, and the MG2 torque $T_{MG2}$ is output in accordance with the aforementioned driver request output.

For example, at time point t36, when the shift control means 37 determines the need to start up-shifting based on the shifting map (not shown) or the like, the torque distribution setting means 46 selects the torque control for each shift and sets the torque output distribution (from S1-2 to S1-13). In response to this, the during-shift drive control means 45 starts the torque control for the first shift and the torque control for the fifth shift (S2-1 and S6-1). At time point t36, the shift control means 37 controls the hydraulic pressure control unit 7 (more specifically, the solenoid valve (not shown) thereof) so as to start increasing the hydraulic pressure $P_{B1}$ of the hydraulic servo of the first brake B1. Accordingly, the friction plate (not shown) of the first brake B1 moves closer to the piston of the hydraulic servo of the first brake B1, that is, so called play elimination is executed. Next, at time point t37, the shift control means 37 controls the hydraulic pressure control unit 7 so as to start decreasing the hydraulic pressure $P_{B2}$ of the hydraulic servo of the second brake B2, thereby starting to ease pressurization of the friction plate by the piston of the hydraulic servo of the second brake B2.

Next, at time point t38, the shift control means 37 gradually decreases the hydraulic pressure $P_{B2}$ of the hydraulic servo of the second brake B2, and gradually increases the hydraulic pressure $P_{B1}$ of the hydraulic servo of the first brake B1. Thus, the transmission torque of the second brake B2 decreases, and the friction plate of the first brake B1 starts to slip, thereby increasing the transmission torque of the first brake B1. Accordingly, the transmission torque of the first brake B1 and the transmission torque of the first brake B1 replace each other. That is, the current phase becomes the torque phase. In the torque phase, the transmission torque of the stepped transmission 6 is reduced. Therefore, when the MG2 torque $T_{MG2}$ of the second motor 4 is substantially constant, as shown in FIG. 15, the second drive torque $T_{OUT2}$ which is output from the second drive unit 10b decreases.

At time point t39, when the ratio of the torque distributed to the first brake B1 and the torque distributed to the second brake B2 is reversed and the transmission torque of the second brake B2 decreases to substantially zero, the torque is transmitted by the first brake B1. Next, the shift control means 37 further increases the hydraulic pressure $P_{B1}$ of the hydraulic servo of the first brake B1. Accordingly, the first brake B1 gradually moves from the slipping state until it is engaged. The gear ratio of the stepped transmission 6 changes from the low-speed stage (Lo) to the high-speed stage (Hi). In accordance with this change, the rotational speed $N_{MG2}$ of the second motor 4 decreases, while the current phase becomes the inertial phase. Then, the inertial phase detection means 48 detects that the current phase is the inertial phase based on the vehicle speed and the change in the rotational speed $N_{MG2}$ of the second motor 4. Note that, after time point t39, the hydraulic pressure $P_{B2}$ of the hydraulic servo of the second brake B2 is bled and the hydraulic pressure $P_{B2}$ decreases to substantially zero.

When the inertial phase detection means 48 detects that the current phase is the inertial phase, the during-shift drive control means 45 starts the torque control for the first shift (Yes at S2-3), and starts the torque control for the fifth shift (Yes at S6-3). Then, while the torque control for the first shift is executed, the driver request output detection means 43, which is included within the during-shift drive control means 45, detects the driver request output (which is assumed to be constant), and the during-shift drive control means 45 detects the rotational speed $N_{MG2}$ of the second motor 4. Further, the during-shift drive control means 45 calculates the MG2 torque $T_{MG2}$ such that the product of the rotational speed $N_{MG2}$ and the MG2 torque $T_{MG2}$ is a predetermined value (that is, a fixed value), and the second motor control means 33 executes control such that the second motor 4 outputs the MG2 torque $T_{MG2}$ (S2-4).

On the other hand, under the torque control for the fifth shift, the motor rotational speed detection means 36 detects the rotational speed $N_{MG2}$ of the second motor 4. Then, the during-shift drive control means 45 calculates the change of the rotational speed of the second motor 4 with respect to the rotational speed of the transmission shaft 21 (the drive wheels 16), and calculates the MG2 torque $T_{MG2}$ which offsets the inertial torque which is generated in the second drive unit 10b (of the stepped transmission 6). Then, the during-shift drive control means 45 executes control such that the second motor control means 33 outputs the calculated MG2 torque $T_{MG2}$, that is, the MG2 torque $T_{MG2}$ decreases by an amount corresponding to the inertial torque (S6-4). Accordingly, the during-shift drive control means 45 executes control such that the two calculated MG2 torques $T_{MG2}$ are output, that is, the torque calculated by the torque control for the first shift and the torque calculated by the torque control for the fifth shift are output, whereby the MG2 torque $T_{MG2}$ which is the sum of the two calculated MG2 torques $T_{MG2}$ is output from the second motor 4.

When the aforementioned controls (S2-4 and S6-4) are repeatedly executed from time point t39 to time point t40, the rotational speed $N_{MG2}$ of the second motor 4 decreases. At the same time, the MG2 torque $T_{MG2}$ increases in accordance with the decrease in the rotational speed $N_{MG2}$ after decreasing by an amount corresponding to the inertial torque. Then, the MG2 torque $T_{MG2}$ further increases as the rotational speed $N_{MG2}$ converges to the high-speed stage (Hi), thereby smoothly increasing the second drive torque $T_{OUT2}$ from the second drive unit 10b. Next, when the first brake B1 becomes substantially fully engaged at time point t40, the second drive torque $T_{OUT2}$ from the second drive unit 10b accords with the driver request output. Subsequently, from time point t40 to time point t41, the shift control means 37 increases the hydraulic pressure $P_{B1}$ of the hydraulic servo of the first brake B1 to the hydraulic pressure required for full engagement, and the shift control is completed at time point t41 (S1-13).

As described above, from time point t39 to time point t40, the product of the rotational speed $N_{MG2}$ of the second motor 4 and the MG2 torque $T_{MG2}$ is a predetermined value that accords with the driver request output, and the driver request output is constant. However, the power consumption $P_{MG2}$ of the second motor 4 also decreases in accordance with the amount of decrease in the MG2 torque $T_{MG2}$ in accordance with the inertial torque.

For example, execution of only the torque control for the first shift from time point t39 to time point t40 as shown in FIG. 5 enables the second drive torque $T_{OUT2}$ that accords with the driver request output to be output from the second drive unit 10b, until shifting is completed (see time point t5). However, the inertial torque is provided in the inertial phase, and thus the output is not smooth. On the other hand, as described above, execution of the torque control for the fifth shift enables the second drive torque $T_{OUT2}$ to be also output from the second drive unit 10b in the inertial phase, as shown in FIG. 15. Moreover, execution of the torque control for the fifth shift combined with either one of the torque control for the second shift, the torque control for the third shift and the torque control for the fourth shift enables the total drive torque $T_{OUT1}+T_{OUT2}$ of the vehicle to be made approximately equal to the driver request output, both in the torque phase and the inertial phase while shifting is executed.

Further, execution of the torque control for the fifth shift by the during-shift drive control means 45 while up-shifting enables the MG2 torque $T_{MG2}$ of the second motor 4 to decrease in the inertial phase, as described above. This decreases the load which is generated when the friction plate of the first brake B1 is slipping, thereby improving durability of the friction plate of the first brake B1.

Next, an example where the torque control for the first shift and the torque control for the fifth shift are executed while down-shifting will be explained with respect to FIG. 16. Note that also in the time chart shown in FIG. 16 the accelerator opening and the driver request output are constant, and that the vehicle speed is substantially constant. As shown in FIG. 16, the hydraulic pressure $P_{B1}$ is supplied to the hydraulic servo of the first brake B1, which causes the first brake B1 to engage. As described above, the stepped transmission 6 is in the high-speed stage (Hi). Further, in this high-speed stage (Hi), the rotational speed $N_{MG2}$ of the second motor 4 accords with the gear ratio of the stepped transmission 6 and the vehicle speed, and the MG2 torque $T_{MG2}$ is output in accordance with the driver request output.

For example, at time point t42, when the shift control means 37 determines the need to start down-shifting based on the shifting map (not shown) or the like, the torque distribution setting means 46 selects the torque control for each shift, and sets the torque output distribution (S1-2 to S1-13). In response to this, the during-shift drive control means 45 starts the torque control for the first shift and the torque control for the fifth shift (S2-1 and S6-1). Further, at time point t42, the shift control means 37 controls the hydraulic pressure control unit 7 (more specifically, the solenoid valve (not shown) thereof) so as to start decreasing the hydraulic pressure $P_{B1}$ of the hydraulic servo of the first brake B1, thereby starting to ease pressurization of the friction plate by the piston of the hydraulic servo of the first brake B1.

Next, at time point t43, the friction plate of the first brake B1 starts to slip. Then, the slipping state of the first brake B1 is gradually intensified and the first brake B1 reaches a released state, and the gear ratio of the stepped transmission 6 changes from the high-speed stage (Hi) to the low-speed stage (Lo). In accordance with this change, the rotational speed $N_{MG2}$ of the second motor 4 increases, while the current phase becomes the inertial phase. Next, the inertial phase detection means 48 detects that the current phase is the inertial phase based on the vehicle speed and the change in the rotational speed $N_{MG2}$ of the second motor 4.

When the inertial phase detection means 48 detects that the current phase is the inertial phase, the during-shift drive control means 45 starts the torque control for the first shift (Yes at S2-3) and the torque control for the fifth shift (Yes at S6-3). Next, in the torque control for the first shift, the driver request output detection means 43 detects the driver request output (which is assumed to be constant, here) and the rotational speed $N_{MG2}$ of the second motor 4, and the during-shift drive control means 45 calculates the MG2 torque $T_{MG2}$ such that a product of the rotational speed $N_{MG2}$ and the MG2 torque $T_{MG2}$ becomes a predetermined value (that is, a fixed value). Then, the second motor control means 33 executes control such that the second motor 4 outputs the MG2 torque $T_{MG2}$ (S2-4).

On the other hand, in the torque control for the fifth shift, the motor rotational speed detection means 36 detects the rotational speed $N_{MG2}$ of the second motor 4, calculates the change of the rotational speed of the second motor 4 with respect to the rotational speed of the transmission shaft 21 (that is, drive wheels 16), and calculates the MG2 torque $T_{MG2}$ which is required for offsetting the inertial torque which is generated in the second drive unit 10b (of the stepped transmission 6). Next, the second motor control means 33 executes control such that the second motor 4 outputs the calculated MG2 torque $T_{MG2}$, that is, the MG2 torque $T_{MG2}$ increases by an amount corresponding to the inertial torque (S6-4). Accordingly, the during-shift drive control means 45 executes control such that the torque calculated by the torque control for the first shift and the torque calculated by the torque control for the fifth shift are output, whereby the MG2 torque $T_{MG2}$ which is the sum of the two MG2 torques $T_{MG2}$ is output from the second motor 4.

From time point t43 to time point t44, when the aforementioned controls (S2-4 and S6-4) are repeatedly executed, the rotational speed $N_{MG2}$ of the second motor 4 increases. At the same time, the MG2 torque $T_{MG2}$ decreases in accordance with the increase in the rotational speed $N_{MG2}$ after increasing by an amount corresponding to the inertial torque. Next, as the rotational speed $N_{MG2}$ converges to the low-speed stage (Lo), the MG2 torque $T_{MG2}$ further decreases, whereby the second drive torque $T_{OUT2}$ from the second drive unit 10b smoothly decreases.

Before the inertial phase ends (i.e., before time point t44), the shift control means 37 controls the hydraulic pressure control unit 7 (more specifically, the linear solenoid valve (not shown) thereof) so as to increase the hydraulic pressure $P_{B2}$ of the hydraulic servo of the second brake B2. Accordingly, the friction plate (not shown) of the second brake B2 moves closer to the piston of the hydraulic servo, that is, so called play elimination is executed.

Next, at time point t44, the shift control means 37 continues decreasing the hydraulic pressure $P_{B1}$ of the hydraulic servo of the first brake B1, and gradually increases the hydraulic pressure $P_{B2}$ of the hydraulic servo of the second brake B2. Accordingly, the transmission torque of the first brake B1 decreases, and the transmission torque of the second brake B2 increases. Therefore, the transmission torque of the first brake B1 and the transmission torque of the second brake B2 replace each other, that is, the inertial phase ends and the torque phase starts (Yes at S2-5 and Yes at S6-5). In the torque phase, the second brake B2 is gradually engaged, and the transmission torque of the stepped transmission 6 increases. Therefore, even when the MG2 torque $T_{MG2}$ of the second motor 4 is substantially constant, as shown in FIG. 16, the second drive torque $T_{OUT2}$ output from the second drive unit 10b increases.

Next, at time point t45, when the ratio of torque distributed to the first brake B1 and torque distributed to the second brake B2 are reversed and the transmission torque of the first brake B1 decreases to substantially zero, the torque is transmitted by the second brake B2. Then, the shift control means 37 further increases the hydraulic pressure $P_{B2}$ of the hydraulic servo of the second brake B2, and the hydraulic pressure $P_{B1}$ of the hydraulic servo of the first brake B1 is bled, whereby the shift control is completed at time point t46 (S1-13).

As shown in FIG. 6, the second drive torque $T_{OUT2}$ of the second drive unit 10b can be output in accordance with the driver request output until shifting is completed (see time point t10). If only the torque control for the first shift is executed from time point t43 to time point t44, the inertial torque is provided in the inertial phase, and thus the output is not smooth. However, execution of the torque control for the fifth shift as described above enables the second drive torque $T_{OUT2}$ of the second drive unit 10b to be output smoothly as shown in FIG. 16. Further, execution of the torque control for the fifth shift combined with either one of the torque control for the second shift, the torque control for the third shift and the torque control for the fourth shift enables the total drive torque $T_{OUT1}+T_{OUT2}$ of the vehicle to be made approximately equal to the driver request output in both the torque phase and the inertial phase during shift.

As described above, according to the control system 1 of the hybrid vehicle, the during-shift drive control means 45 executes the torque control for the first shift to the torque control for the fifth shift. Accordingly, while the shift control means 37 executes the shift control of the stepped transmission 6 and before this shift control is completed, the second drive torque $T_{OUT2}$ which is output from the second drive unit 10b is controlled such that the driving forces which are output from the first drive unit 10a and the second drive unit 10b to the drive wheels 16, 16 equal the driver request output. At the same time, control is executed such that the difference between the driver request output and the total drive torque $T_{OUT1}+T_{OUT2}$ which is output to the drive wheels 16, 16 based on the change in the transmission force of the stepped transmission 6 is reduced as caused by the switch-over between the first brake B1 and the second brake B2. Further, in the inertial phase where the first brake B1 and the second brake B2 replace each other, the second motor control means 33 executes control such that the inertial torque caused by the change in the rotational speed of the second motor 4 with respect to the drive wheels 16 is absorbed by the second motor 4. Therefore, shifting using the stepped transmission 6 prevents an increase in the rotational speed of the second motor 4 and eliminates the need to increase the size of the second motor 4. Further, the control system is capable of outputting the driver request output from the first drive unit 10a and the second drive unit 10b to the drive wheels 16, 16 when the shift control is completed. Accordingly, the control system 1 is capable of decreasing the change in the driving force during shifting which is generated by the change in the transmission force of the stepped transmission 6 that results from the switch-over between the first brake B1 and the second brake B2, even when shifting of the stepped transmission 6 is executed. At the same time, the control system 1 is capable of eliminating the change in the driving force which is generated by a change in the inertial force in the inertial phase during shift and which is output to the drive wheels 16, 16. Accordingly, this prevents the driver from feeling a sense of discomfort.

Further, the during-shift drive control means 45 executes the torque control for the second shift and the torque control for the third shift so as to control the first drive torque $T_{OUT1}$ which is output from the first drive unit 10a. Accordingly, drive torque that accords the change of the second drive torque $T_{OUT2}$ of the second drive unit 10b caused by shifting of the stepped transmission 6, and which is made approximately equal to the driver request output, can be output to the drive wheels 16, 16.

The torque control for the second shift by the during-shift drive control means 45 is enabled in the following manner. Particularly in the torque phase where the transmission torque of the stepped transmission 6 changes, the first motor control means 33 executes control so as to change the rotational speed $N_E$ of the engine 2 by changing the reaction force of the first motor 3, whereby the inertial force of the engine 2 changes. Accordingly, the first drive torque $T_{OUT1}$ from the first drive control means 10b changes, in accordance with the change of the second drive torque $T_{OUT2}$ from the second drive unit 10b.

Furthermore, the torque control for the third shift executed by the during-shift drive control means 45 is enabled in the following manner. Particularly in the torque phase where the transmission torque of the stepped transmission 6 changes, the engine control means 31 executes control so as to change the drive torque $T_E$ of the engine 2, and the first motor control means 33 executes control so as to change the rotational speed $N_E$ of the engine 2, whereby the first drive torque $T_{OUT1}$ from the first drive control means 10b changes.

Moreover, the during-shift drive control means 45 executes the torque control for the fourth shift, so as to control the second drive torque $T_{OUT2}$ from the second drive unit 10b. Accordingly, the control system is capable of outputting the drive torque which is made approximately equal to the driver request output to the drive wheels 16, 16, in accordance with the change of the second drive torque $T_{OUT2}$ of the second drive unit 10b which is caused by shifting of the stepped transmission 6.

Furthermore, the torque control for the fourth shift executed by the during-shift drive control means 45 is enabled in the following manner. Particularly in the torque phase where the transmission torque of the stepped transmission 6 changes, the second motor control means 33 executes control so as to change the drive torque $T_{MG2}$ of the second motor 4, whereby the drive torque $T_{MG2}$ accords with the change in the transmission torque.

Moreover, because the control system 1 is provided with the torque phase detection means 47 which detects the torque phase in the switch-over between the first brake B1 and the second brake B2, the control system 1 is capable of detecting the torque phase during shifting of the stepped transmission 6. The control system 1 is also capable of detecting the torque phase based on the command signal which is output from the shift control means 37, the hydraulic pressures $P_{B1}$, $P_{B2}$ of the hydraulic servos of the first brake B1 and the second brake B2, respectively, and an oil temperature of the hydraulic pressure control unit 7.

Moreover, as the control system 1 is provided with the inertial phase detection means 48 which detects the inertial phase in the switch-over between the first brake B1 and the second brake B2, the control system 1 is capable of detecting the inertial phase during shifting of the stepped transmission 6. Moreover, the control system 1 is capable of detecting the inertial phase based on the rotational speed $N_{MG2}$ of the second motor 4 and the vehicle speed.

In this embodiment, an explanation is given of the stepped transmission 6 which is equipped with the first brake B1 and the second brake B2 and which is capable of two-speed shifting between the high-speed stage (Hi) and the low-speed stage (Lo). However, the invention is not limited to this configuration. For example, the stepped transmission 6 may be a multi-stage transmission, which, for example, executes three-speed shifting or four-speed shifting.

In this embodiment, an explanation is given of the torque phase detection means 47 which detects the torque phase in the switch-over between the first brake B1 and the second brake B2, based on the hydraulic command for the hydraulic servos of the first brake B1 and the second brake B2 which are output from the shift control means 37, or based on the hydraulic pressures of the hydraulic servos of the first brake B1 and the second brake B2 detected by the hydraulic pressure detection means 38 and the oil temperature detection means 39. However, the invention is not limited to this configuration. The torque phase may be detected by a torque sensor which is installed in the output shaft 26 (transmission shaft 21) based on when the second drive torque $T_{OUT2}$ of the second drive unit 10b becomes smaller than the MG2 torque $T_{MG2}$ of the second motor 4. Alternatively, the torque phase may be detected by an accelerator sensor which is installed in the output shaft 26 (transmission shaft 21) based on the change in the acceleration. The invention is not limited to these examples, and any method may be used to perform the role of the torque phase detection means 47 as long as it enables the torque phase to be detected.

In this embodiment, an explanation is given of the inertial phase detection means 48 which detects the inertial phase based on the rotational speed $N_{MG2}$ of the second motor 4 detected by the motor rotational speed detection means 36 and the vehicle speed detected by the vehicle speed detection means 40. Alternatively, the inertial phase may be detected based on the hydraulic commands output by the shift control means 37 and based on the hydraulic pressure detected based on the hydraulic pressure detection means 38 and the oil temperature detection means 39. However, the invention is not limited to these, and any method may be used to perform the role of the inertial phase detection means 48 as long as it enables the inertial phase to be detected.

In this embodiment, an explanation is given of cases where the torque control for the first shift and the torque control for the second shift are executed, the torque control for the first shift and the torque control for the third shift are executed, the torque control for the first shift and the torque control for the fourth shift, and the torque control for the first shift and the torque control for the fifth shift are executed, respectively, as examples where the torque distribution setting means 46 selects the torque control for each shift and sets the output distribution. However, the invention is not limited to this configuration, and selection of any single control or a combination of controls is possible. For example, when the driver request output is changed while one control is being executed during shifting, another control may be started.

Note that, the torque distribution setting means 46 preferably selects the torque control for each shift and set output distribution, based on the characteristics of the hybrid vehicle in which the invention is applied, the characteristics of the first and second motors, the battery capacity, and the remaining charge of the battery during shifting. However, in an exemplary embodiment, the priority sequence for selection is: selecting the torque control for the first shift and the torque control for the second shift; selecting the torque control for the first shift and the torque control for the third shift when the rotational speed $N_E$ cannot decrease; selecting the torque control for the fourth shift when the battery cannot be charged because the battery remaining charge is large; and selecting the torque control for the fifth shift when the vehicle speed is high and the rotational speed $N_{MG2}$ of the second motor 4 is high.

Thus, in review, in the control system, during shift control of a stepped transmission by shift control means and before the shift control is completed, during-shift drive control means controls a driving force output from a second drive unit such that a driving force output to drive wheels from a first and second drive units equals a driver request output. Further, the during-shift drive control means executes control so as to reduce a difference between the driving force output to the drive wheels and the driver request output based on a change in a transmission force of the stepped transmission caused by switch-over of a plurality of friction engagement elements. Moreover, in an inertial phase of the switch-over of the plurality of friction engagement elements, second motor control means which is included within the during-shift drive control means executes control such that a second motor absorbs an inertial force caused by a change of a ratio of a rotational speed of the second motor with respect to a rotational speed of the drive wheels. Accordingly, use of the stepped transmission for shifting prevents the rotational speed of the second motor from increasing and allows a size of the second motor to be reduced.

The control system is capable of outputting the driver request output from the first and second drive units to the drive wheels when the shift control is completed, and reducing a change in the driving force during shifting. This change in the driving force is caused by a change in the transmission force of the stepped transmission due to the switch-over of the plurality of the friction engagement elements during shifting of the stepped transmission. At the same time, a change in the driving force output to the drive wheels caused by a change in the inertial force in the inertial phase during shifting, can be eliminated. Accordingly, it is possible to prevent the driver from feeling a sense of discomfort.

In a control system according to another aspect, the first drive control means, which is included within the during-shift drive control means, controls a driving force output from the first drive unit, whereby the during-shift drive control means executes control so as to reduce a difference between the driver request output and the driving force output to the drive wheels. Therefore, although the driving force from the second drive unit changes because of shifting of the stepped transmission, the control system is capable of outputting a driving force to the drive wheels which is made approximately equal to the driver request output by controlling the driving force of the first drive unit. Accordingly, it is possible to reduce a change in the driving force during shifting which results from a change in the transmission torque of the stepped transmission that results from the switch-over of the plurality of the friction engagement elements, thereby preventing the driver from feeling a sense of discomfort.

In a control system according to a further aspect, in a torque phase of the switch-over of the plurality of friction engagement elements, the first motor control means, which is included within the during-shift drive control means, executes control so as to change a rotational speed of the engine by changing the reaction force of the first motor, and the during-shift drive control means executes control so as to change the driving force from the first drive unit by generating an inertial force of the engine. Accordingly, the during-shift drive control means is capable of reducing the difference between the driving force output to the drive wheels and the driver request output, in accordance with the change in the transmission force of the stepped transmission particularly in the torque phase of shifting. Accordingly, it is possible to reduce a change in the driving force during shifting which is caused by a change in the transmission torque of the stepped transmission that results from the switch-over of the plurality of the friction engagement elements. Therefore, it is possible to prevent the driver from feeling a sense of discomfort.

In a control system according to yet another aspect, in a torque phase of the switch-over of the plurality of friction engagement elements, the engine control means, which is included within the during-shift drive control means, executes control so as to change the driving force of the engine. At the same time, the first motor control means, which is also included within the during-shift drive control means, executes control so as to change the driving force from the first drive unit, by changing the reaction force of the first motor. Accordingly, the during-shift drive control means is capable of reducing a difference between the driver request output and the driving force which is output to the drive wheels, in accordance with the change in the transmission force of the stepped transmission, particularly in the torque phase during shift. Accordingly, it is possible to reduce a change in the driving force during shifting which is caused by a change in the transmission torque of the stepped transmission that results from the switch-over of the plurality of the friction engagement elements. Thus, it is possible to prevent the driver from feeling a sense of discomfort.

In a control system according to a still further aspect, the second drive control means, which is included within the during-shift drive control means, controls the driving force which is output from the second drive unit, whereby the during-shift drive control means executes control so as to reduce a difference between the driver request output and the driving force which is output to the drive wheels. Accordingly, by controlling the driving force of the second drive unit, the during-shift drive control means is capable of outputting a driving force to the drive wheels which is made approximately equal to the driver request output, in accordance with the change in the driving force of the second drive unit which is generated by shifting of the stepped transmission. Accordingly, it is possible to reduce a change in the driving force during shifting which is caused by a change in the transmission torque of the stepped transmission that results from the switch-over of the plurality of the friction engagement elements, thereby preventing the driver from feeling a sense of discomfort.

In a control system according to an additional aspect, in a torque phase of the switch-over of the plurality of friction engagement elements, second motor control means, which is included within the during-shift drive control means, executes control so as to change the driving force of the second motor which is output to the drive wheels, whereby the during-shift drive control means executes control so as to reduce a difference between the driver request output and the driving force. Therefore, the during-shift drive control means is capable of reducing a difference between the driver request output and the driving force which is output to the drive wheels, in accordance with the change in the transmission force of the stepped transmission, particularly in the torque phase during shift. Accordingly, it is possible to reduce a change in the driving force during shifting, which is caused by a change in the transmission torque of the stepped transmission that results from the switch-over of the plurality of the friction engagement elements, thereby preventing the driver from feeling a sense of discomfort.

A control system according to a further aspect is provided with torque phase detection means which detects the torque phase of the switch-over of the plurality of friction engagement elements. Therefore, the control system is capable of detecting the torque phase during shifting of the stepped transmission. The torque phase may be detected, based on a command signal which is output from the shift control means or a combination of hydraulic pressures of hydraulic servos of the plurality of the friction engagement elements which are controlled by a hydraulic pressure control unit and an oil temperature of the hydraulic pressure control unit or based on a rotational speed of the second motor and a vehicle speed.

A control system according to another aspect is provided with inertial phase detection means which detects the inertial phase of the switch-over of the plurality of friction engagement elements. Therefore, the control system is capable of detecting the inertial phase during shifting of the stepped transmission.

In a control system according to yet another aspect, the stepped transmission includes a first brake which can be engaged by control of the hydraulic pressure control unit, a second brake which can be engaged by control of the hydraulic pressure control unit, and a planetary gear unit having a first rotation element connected to the second motor, a second rotation element connected to the transmission shaft, a third rotation element connected to the first brake, and a fourth rotation element connected to the second brake. Further, the switch-over of the plurality of the friction engagement elements is switch-over between the first brake and the second brake. Therefore, the stepped transmission is capable of two-speed shifting between a high-speed stage and a low-speed stage. Accordingly, the second motor can be used at a low rotational speed, thus enabling the size of the second motor to be reduced and ease of mountability in the vehicle of the second motor to be improved.

What is claimed is:

1. A control system for a hybrid vehicle, the hybrid vehicle including a first drive unit having a first motor and a planetary gear for power distribution capable of distributing a driving force of an engine to the first motor and a transmission shaft connected to a drive wheel while the first motor outputs a reaction force; and a second drive unit having a second motor and a stepped transmission which is interposed between the second motor and the transmission shaft and which is capable of changing a rotational speed of rotatory transmission of the second motor and the transmission shaft by switch-over of a plurality of friction engagement elements which are controlled so as to be selectively engaged by a hydraulic pressure control executed by a hydraulic pressure control unit, the control system comprising:

first drive control means capable of controlling a driving force which is output from the first drive unit to the transmission shaft;

second drive control means capable of controlling a driving force which is output from the second drive unit to the transmission shaft;

shift control means capable of executing shift control of the stepped transmission; and driver request output detection means which detects a driver request output that is requested by a driver, wherein the first drive control means and the second drive control means execute control such that the driving force output from the first drive unit and the second drive unit to the drive wheels equals the driver request output;

during-shift drive control means which controls the driving force output from the second drive unit such that the driving force output from the first drive unit and the second drive unit to the drive wheel equals the driver request output; executes control so as to reduce a difference between the driving force output to the drive wheel and the driver request output based on a change in a transmission force of the stepped transmission that results from the switch-over of the plurality of friction engagement elements; and which controls the driving force of the second motor so as to absorb an inertial force which is generated by a change in the rotational speed of the second motor, with respect to the rotational speed of the drive wheels in an inertial phase of the switch-over of the plurality of friction engagement elements.

2. The control system for a hybrid vehicle according to claim 1, wherein the first drive control means which is included within the during-shift drive control means controls the driving force output from the first drive unit, whereby the during-shift drive control means executes control so as to reduce the difference between the driving force output to the drive wheel and the driver request output based on the change in the transmission force of the stepped transmission that results from the switch-over of the plurality of the friction engagement elements.

3. The control system for a hybrid vehicle according to claim 2, wherein the first drive control means includes first motor control means capable of controlling the driving force of the first motor and engine control means capable of controlling the driving force of the engine; and in the switch-over of the plurality of the friction engagement elements during shifting, the engine control means which is included within the during-shift drive control means executes control so as to change the driving force of the engine, the first motor control means, which is also included within the during-shift drive control means, executes control so as to change the reaction force of the first motor, and the during-shift drive control means changes the driving force from the first drive unit, whereby the during-shift drive control means executes control so as to reduce the difference between the driving force output to the drive wheel and the driver request output based on the change in the transmission force of the stepped transmission that results from the switch-over of the plurality of the friction engagement elements.

4. The control system for a hybrid vehicle according to claim 2, wherein the second drive control means, which is included within the during-shift drive control means, controls the driving force which is output from the second drive unit, whereby the during-shift drive control means executes control so as to reduce the difference between the driving force output to the drive wheel and the driver request output based on the change in the transmission force of the stepped transmission that results from the switch-over of the plurality of the friction engagement elements.

5. The control system for a hybrid vehicle according to claim 2, wherein the first drive control means includes first motor control means capable of controlling the driving force of the first motor and engine control means capable of controlling the driving force of the engine; and in the switch-over of the plurality of the friction engagement elements during shifting, the first motor control means, which is included within the during-shift drive control means, executes control so as to change a rotational speed of the engine by changing the reaction force of the first motor, and the during-shift drive control means executes control so as to change the driving force from the first drive unit by generating an inertial force of the engine, whereby the during-shift drive control means executes control so as to reduce the difference between the driving force output to the drive wheel and the driver request output based on the change in the transmission force of the stepped transmission that results from the switch-over of the plurality of the friction engagement elements.

6. The control system for a hybrid vehicle according to claim 5, wherein the second drive control means, which is included within the during-shift drive control means, controls the driving force which is output from the second drive unit, whereby the during-shift drive control means executes control so as to reduce the difference between the driving force output to the drive wheel and the driver request output based on the change in the transmission force of the stepped transmission that results from the switch-over of the plurality of the friction engagement elements.

7. The control system for a hybrid vehicle according to claim 6, wherein the second drive control means includes second motor control means capable of controlling the driving force of the second motor, and in a torque phase of the switch-over of the plurality of the friction engagement elements, the second motor control means, which is included within the during-shift drive control means, executes control so as to change the driving force from the second drive unit, whereby the during-shift drive control means executes control so as to reduce the difference between the driving force output to the drive wheel and the driver request output based on the change in the transmission force of the stepped transmission that results from the switch-over of the plurality of the friction engagement elements.

8. The control system for a hybrid vehicle according to claim 7, further comprising torque phase detection means which detects the torque phase of the switch-over of the plurality of the friction engagement elements.

9. The control system for a hybrid vehicle according to claim 7, further comprising inertial phase detection means which detects the inertial phase of the switch-over of the plurality of the friction engagement elements.

10. The control system for a hybrid vehicle according to claim 1, wherein the second drive control means, which is included within the during-shift drive control means, controls the driving force which is output from the second drive unit, whereby the during-shift drive control means executes control so as to reduce the difference between the driving force output to the drive wheel and the driver request output based on the change in the transmission force of the stepped transmission that results from the switch-over of the plurality of the friction engagement elements.

11. The control system for a hybrid vehicle according to claim 10, wherein the second drive control means includes second motor control means capable of controlling the driving force of the second motor, and in a torque phase of the switch-over of the plurality of the friction engagement elements, the second motor control means, which is included within the during-shift drive control means, executes control so as to change the driving force from the second drive unit, whereby the during-shift drive control means executes control so as to reduce the difference between the driving force output to the drive wheel and the driver request output based on the change in the transmission force of the stepped transmission that results from the switch-over of the plurality of the friction engagement elements.

12. The control system for a hybrid vehicle according to claim 11, further comprising torque phase detection means which detects the torque phase of the switch-over of the plurality of the friction engagement elements.

13. The control system for a hybrid vehicle according to claim 11, further comprising inertial phase detection means which detects the inertial phase of the switch-over of the plurality of the friction engagement elements.

14. The control system for a hybrid vehicle according to claim 11, wherein in the torque phase, control is executed such that the driving force of the second motor is increased while up-shifting, and such that the driving force of the second motor is decreased while down-shifting.

15. The control system for a hybrid vehicle according to claim 14, wherein the power consumption of the second motor before shifting is the same as that after shifting.

16. The control system for a hybrid vehicle according to claim 1, further comprising torque phase detection means which detects the torque phase of the switch-over of the plurality of the friction engagement elements.

17. The control system for a hybrid vehicle according to claim 1, further comprising inertial phase detection means which detects the inertial phase of the switch-over of the plurality of the friction engagement elements.

18. The control system for a hybrid vehicle according to claim 1, wherein the stepped transmission includes a first brake which can be engaged by control executed by the hydraulic pressure control unit, a second brake which can be engaged by control of the hydraulic pressure control unit, and a planetary gear unit having a first rotation element connected to the second motor, a second rotation element connected to the transmission shaft, a third rotation element connected to the first brake, and a fourth rotation element connected to the second brake, and the switch-over of the plurality of the friction engagement elements is a switch-over between the first brake and the second brake.

19. A control system for a hybrid vehicle, the hybrid vehicle including a first drive unit having a first motor and a planetary gear for power distribution capable of distributing a driving force of an engine to the first motor and a transmission shaft connected to a drive wheel while the first motor outputs a reaction force; and a second drive unit having a second motor and a stepped transmission which is interposed between the second motor and the transmission shaft and which is capable of changing a rotational speed of rotatory transmission of the second motor and the transmission shaft by switch-over of a plurality of friction engagement elements which are controlled so as to be selectively engaged by a hydraulic pressure control executed by a hydraulic pressure control unit, the control system comprising:

a first drive control element that controls a driving force which is output from the first drive unit to the transmission shaft;

a second drive control element that controls a driving force which is output from the second drive unit to the transmission shaft;

a shift control element that executes shift control of the stepped transmission; and a driver request output detection element that detects a driver request output that is requested by a driver, wherein the first drive control element and the second drive control element execute control such that the driving force output from the first drive unit and the second drive unit to the drive wheels equals the driver request output;

a during-shift drive control element that controls the driving force output from the second drive unit such that the driving force output from the first drive unit and the second drive unit to the drive wheel equals the driver request output; executes control so as to reduce a difference between the driving force output to the drive wheel and the driver request output based on a change in a transmission force of the stepped transmission that results from the switch-over of the plurality of friction engagement elements; and controls the driving force of the second motor so as to absorb an inertial force which is generated by a change in the rotational speed of the second motor, with respect to the rotational speed of the drive wheels in an inertial phase of the switch-over of the plurality of friction engagement elements.

20. A control method for a hybrid vehicle, the hybrid vehicle including a first drive unit having a first motor and a planetary gear for power distribution capable of distributing a driving force of an engine to the first motor and a transmission shaft connected to a drive wheel while the first motor outputs a reaction force; and a second drive unit having a second motor and a stepped transmission which is interposed between the second motor and the transmission shaft and which is capable of changing a rotational speed of rotatory transmission of the second motor and the transmission shaft by switch-over of a plurality of friction engagement elements which are controlled so as to be selectively engaged by a hydraulic pressure control executed by a hydraulic pressure control unit, the control method comprising:

controlling a driving force which is output from the first drive unit to the transmission shaft;

controlling a driving force which is output from the second drive unit to the transmission shaft;

executing shift control of the stepped transmission; and detecting a driver request output that is requested by a driver;

executing control such that the driving force output from the first drive unit and the second drive unit to the drive wheels equals the driver request output;

controlling the driving force output from the second drive unit such that the driving force output from the first drive unit and the second drive unit to the drive wheel equals the driver request output; executing control so as to reduce a difference between the driving force output to the drive wheel and the driver request output based on a change in a transmission force of the stepped transmission that results from the switch-over of the plurality of friction engagement elements; and controlling the driving force of the second motor so as to absorb an inertial force which is generated by a change in the rotational speed of the second motor, with respect to the rotational speed of the drive wheels in an inertial phase of the switch-over of the plurality of friction engagement elements.

* * * * *

UNITED STATES PATENT AND TRADEMARK OFFICE
CERTIFICATE OF CORRECTION

PATENT NO. : 6,932,176 B2
DATED : August 23, 2005
INVENTOR(S) : Takami et al.

It is certified that error appears in the above-identified patent and that said Letters Patent is hereby corrected as shown below:

Title page,
Item [73], Assignees, delete "Aisin AW Co., Ltd., Anjo (JP); Toyota Jidosha Kabushiki Kaisha, Toyota (JP)" and replace with:
-- Aisin AW Co., Ltd., Anjo (JP); Toyota Jidosha Kabushiki Kaisha, Toyota (JP) --.

Signed and Sealed this

Third Day of January, 2006

JON W. DUDAS
*Director of the United States Patent and Trademark Office*